US012745300B2

(12) United States Patent
Kim et al.

(10) Patent No.: US 12,745,300 B2
(45) Date of Patent: Sep. 22, 2026

(54) ELECTRONIC DEVICE FOR PERFORMING MATCHING BETWEEN ELECTRONIC DEVICES AND OPERATION METHOD THEREOF

(71) Applicant: SAMSUNG ELECTRONICS CO., LTD., Suwon-si (KR)

(72) Inventors: Dalsung Kim, Suwon-si (KR); Kyungik Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 455 days.

(21) Appl. No.: 18/317,518

(22) Filed: May 15, 2023

(65) Prior Publication Data

US 2023/0284300 A1 Sep. 7, 2023

Related U.S. Application Data

(63) Continuation of application No. PCT/KR2022/012589, filed on Aug. 23, 2022.

(30) Foreign Application Priority Data

Sep. 6, 2021 (KR) ........................ 10-2021-0118413

(51) Int. Cl.
*H04W 8/00* (2009.01)
*H04W 76/14* (2018.01)

(52) U.S. Cl.
CPC ........... *H04W 76/14* (2018.02); *H04W 8/005* (2013.01)

(58) Field of Classification Search
CPC ....... H04W 8/00; H04W 8/005; H04W 76/14; H04W 4/80
See application file for complete search history.

(56) References Cited

U.S. PATENT DOCUMENTS 9,949,015 B1 4/2018 Minoo et al.
9,967,649 B2 5/2018 Chandramohan et al.
(Continued)

FOREIGN PATENT DOCUMENTS

CN 107809514 A 3/2018
CN 108174457 6/2018
(Continued)

OTHER PUBLICATIONS

Extended Search Report dated Jul. 5, 2024 in European Patent Application No. 22864941.4.
(Continued)

*Primary Examiner* — Tuan H Nguyen
(74) *Attorney, Agent, or Firm* — Nixon & Vanderhye, P.C.

(57) ABSTRACT

A first wireless communication device may include a communication module, a connector configured to be connected to a cradle when the first wireless communication device is placed in the cradle, a memory including a first area in which a matching identifier of the first wireless communication device is stored and a second area for storing a matching identifier of a second wireless communication device matched to the first wireless communication device, and a processor, wherein the processor is configured to receive a matching identifier transmission request from the cradle, transmit the matching identifier of the first wireless communication device to the cradle, receive the matching identifier of the second wireless communication device from the cradle, store the matching identifier of the second wireless communication device in the second area of the memory, and transmit a matching completion signal to the electronic device through the wireless communication link.

20 Claims, 17 Drawing Sheets

(56) References Cited

U.S. PATENT DOCUMENTS

| | | | | |
|---|---|---|---|---|
| 9,967,650 | B2 | 5/2018 | Chawan et al. | |
| 10,277,972 | B2 | 4/2019 | Liu et al. | |
| 11,445,285 | B2 | 9/2022 | Zhao | |
| 11,457,302 | B2 | 9/2022 | Kim et al. | |
| 2016/0098264 | A1 | 4/2016 | Proschowsky | |
| 2017/0013342 | A1 * | 1/2017 | Watson | H04R 1/1016 |
| 2018/0367883 | A1 | 12/2018 | Minoo et al. | |
| 2020/0216228 | A1 | 7/2020 | Wang et al. | |
| 2021/0152036 | A1 | 5/2021 | Sun et al. | |
| 2021/0329370 | A1 | 10/2021 | Kim | |
| 2022/0191669 | A1 | 6/2022 | Kim et al. | |

FOREIGN PATENT DOCUMENTS

| | | | | |
|---|---|---|---|---|
| CN | 108811182 | * | 11/2018 | H04R 1/10 |
| CN | 109491691 | | 3/2019 | |
| CN | 109639902 A | | 4/2019 | |
| CN | 111757206 | | 10/2020 | |
| CN | 112351361 | * | 2/2021 | H04R 1/10 |
| KR | 20090012753 A | | 2/2009 | |
| KR | 20170039570 A | | 4/2017 | |
| KR | 20180021030 A | | 2/2018 | |
| KR | 101992036 B1 | | 6/2019 | |
| KR | 20200056330 A | | 5/2020 | |
| KR | 20210032104 A | | 3/2021 | |
| KR | 20210059389 A | | 5/2021 | |
| KR | 20210101702 A | | 8/2021 | |
| WO | 2021/043160 | | 3/2021 | |

OTHER PUBLICATIONS

Communication pursuant to Article 94(3) EPC in European Application No. 22864941.4.

International Search Report for PCT/KR2022/012589 mailed Dec. 6, 2022, 5 pages.

Written Opinion of the ISA for PCT/KR2022/012589 mailed Dec. 6, 2022, 6 pages.

Office Action dated Oct. 20, 2025 in Korean Application No. 10-2021-0118413 and English-language translation.

Office Action dated Dec. 16, 2025 in European Application No. 22864941.4.

* cited by examiner

ELECTRONIC DEVICE FOR PERFORMING MATCHING BETWEEN ELECTRONIC DEVICES AND OPERATION METHOD THEREOF

CROSS-REFERENCE TO RELATED APPLICATIONS

This application is a continuation of International Application No. PCT/KR2022/012589 designating the United States, filed on Aug. 23, 2022, in the Korean Intellectual Property Receiving Office and claiming priority to Korean Patent Application No. 10-2021-0118413, filed on Sep. 6, 2021, in the Korean Intellectual Property Office, the disclosures of each of which are incorporated by reference herein in their entireties.

BACKGROUND

1. Field

The disclosure relates to an electronic device for matching electronic devices and an operation method thereof.

2. Description of Related Art

With the advance of digital technology, various electronic devices, such as earphones, earbuds, a wireless speaker, or a wireless headset, for outputting audio data reproduced in audio source devices including a mobile communication terminal, a personal digital assistant (PDA), an electronic organizer, a smartphone, a tablet personal computer (PC), or a wearable device, are being distributed. Such electronic devices can receive audio data from an audio source device through establishment of wireless communication with the audio source device.

In relation to the wireless communication establishment technology described above, the BLUETOOTH™ standard defines a protocol for short-range wireless communication between electronic devices. In a BLUETOOTH network environment, electronic devices may transmit or receive a data packet including contents, such as text, voice, image, or video, in a designated frequency band. For example, a user terminal (user equipment; UE), such as a smartphone, a tablet, a desktop computer, or a laptop computer, may transmit a data packet to another user terminal or accessory device.

Electronic devices (e.g., a pair of wireless earphones, and a wireless speaker) may generate independent communication links (e.g., audio over BLUETOOTH low energy (AoBLE) topology) with a user terminal (e.g., a smartphone), respectively, for the same purpose and to provide the same service. In order to provide the same purpose and the same service, the electronic devices may be matched or coupled.

SUMMARY

In accordance with the above discussion, embodiments of the disclosure provide an electronic device for, when at least one of electronic devices operating in a set of two or more electronic devices is lost or broken, more conveniently matching a new electronic device as replacement to an existing electronic device, and an operation method thereof.

In addition, embodiments of the disclosure provide a device for providing an intuitive user interface to match electronic devices operating as one set so as to provide a user with convenience, and an operation method thereof.

In addition, embodiments of the disclosure provide a device for performing matching by means of a power supply device (e.g., cradle) to which electronic devices operating as one set are mounted, and an operation method thereof.

According to various example embodiments, a first wireless communication device may include a communication module configured to establish a wireless communication link with an electronic device, a connector configured for connection to a cradle when the first wireless communication device is placed in the cradle, a memory including a first area in which a matching identifier of the first wireless communication device is stored, and a second area for storing a matching identifier of a second wireless communication device matched to the first wireless communication device, and a processor connected to the communication module and the memory, wherein the processor is configured to receive a matching identifier transmission request from the cradle, transmit the matching identifier of the first wireless communication device to the cradle in response to receiving the matching identifier transmission request, receive the matching identifier of the second wireless communication device from the cradle, store the matching identifier of the second wireless communication device in the second area of the memory in response to receiving the matching identifier of the second wireless communication device, and transmit a matching completion signal to the electronic device through the wireless communication link in response to the storage of the matching identifier of the second wireless communication device in the second area of the memory.

According to various example embodiments, a cradle may include a first connector configured for electrical connection with a first wireless communication device, a second connector configured for electrical connection with a second wireless communication device, and a processor electrically connected to the first connector and the second connector, wherein the processor is configured to identify that the first wireless communication device and the second wireless communication device are mounted in the cradle, receive a matching start signal from the first wireless communication device in a state in which the first wireless communication device and the second wireless communication device are mounted in the cradle, transmit information for matching between the first wireless communication device and the second wireless communication device to the first wireless communication device and the second wireless communication device via the first connector and the second connector, respectively, in response to receiving the matching start signal from the first wireless communication device, and transmit reboot commands to the first wireless communication device and the second wireless communication device.

According to various example embodiments, an electronic device may include a communication module, a display configured to display a user interface related to matching between a first wireless communication device and a second wireless communication device, and a processor electrically connected to the communication module and the display, wherein the processor is configured to establish a first communication link with the first wireless communication device, display a first user interface related to matching between the first wireless communication device and the second wireless communication device via the display in a state in which the first communication link is established, receive a user input to perform matching from the first user interface, transmit a matching command to the first wireless communication device in response to receiving the user input to perform matching, receive a matching completion signal from the first wireless communication device, and display, via the display, a second user interface including information indicating that matching between the first wireless communication device and the second wireless communication device has been completed.

According to various example embodiments, an electronic device may provide an intuitive user interface to match electronic devices so as to offer an effect of more convenient matching.

According to various example embodiments, an electronic device may provide matching between electronic devices via a user interface provided to a user terminal without separately manipulating a cradle and the electronic devices, so as to provide a user with convenience.

Effects which can be acquired by the disclosure are not limited to the effects described above, and other effects that have not been mentioned may be clearly understood by those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various embodiments disclosed herein will be described with reference to the accompanying drawings. However, it is not intended to limit the technological features set forth herein to particular embodiments and includes various modifications, equivalents, and/or alternatives for a corresponding embodiment.

Figure 1:
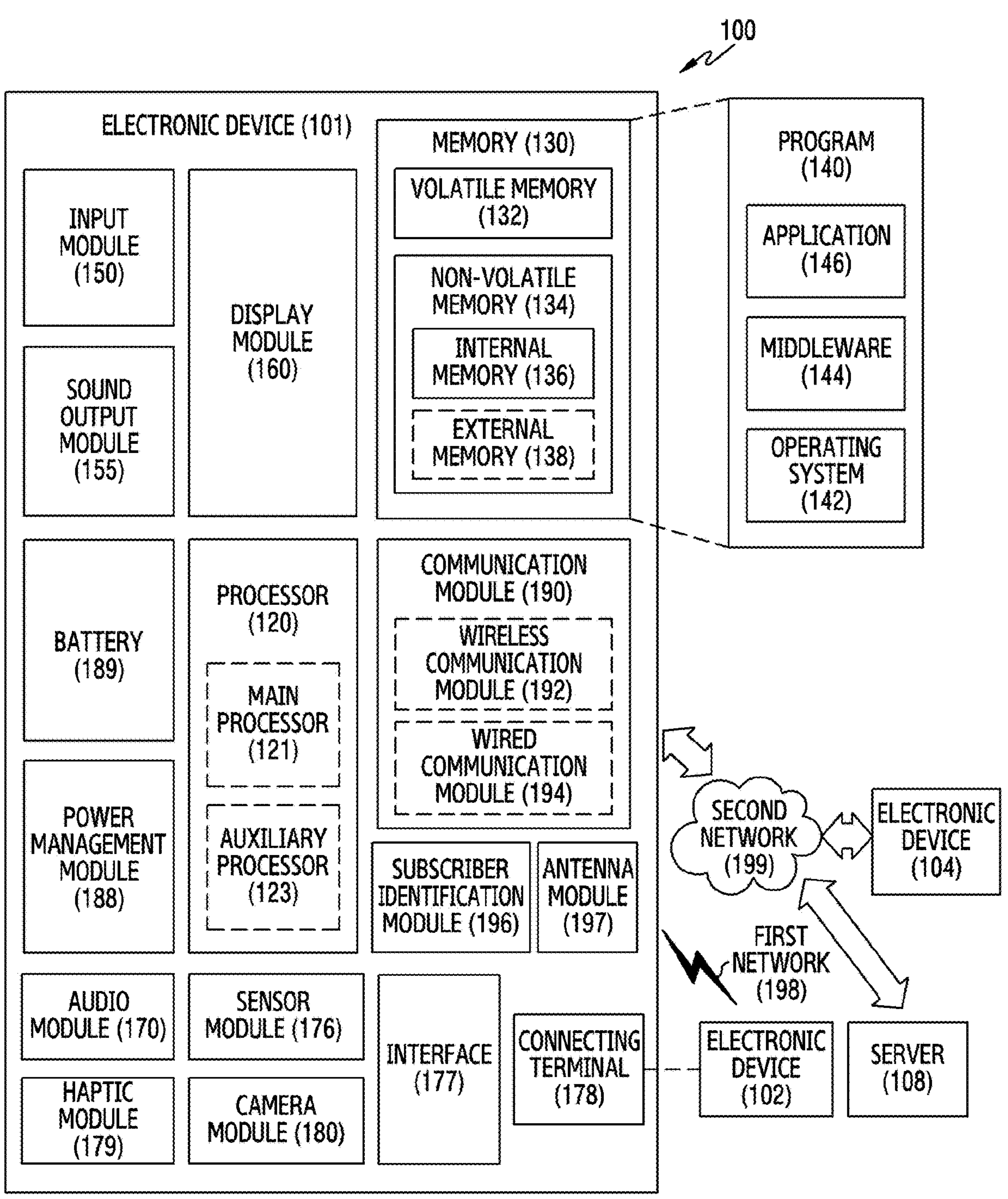
FIG. 1 is a block diagram of an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
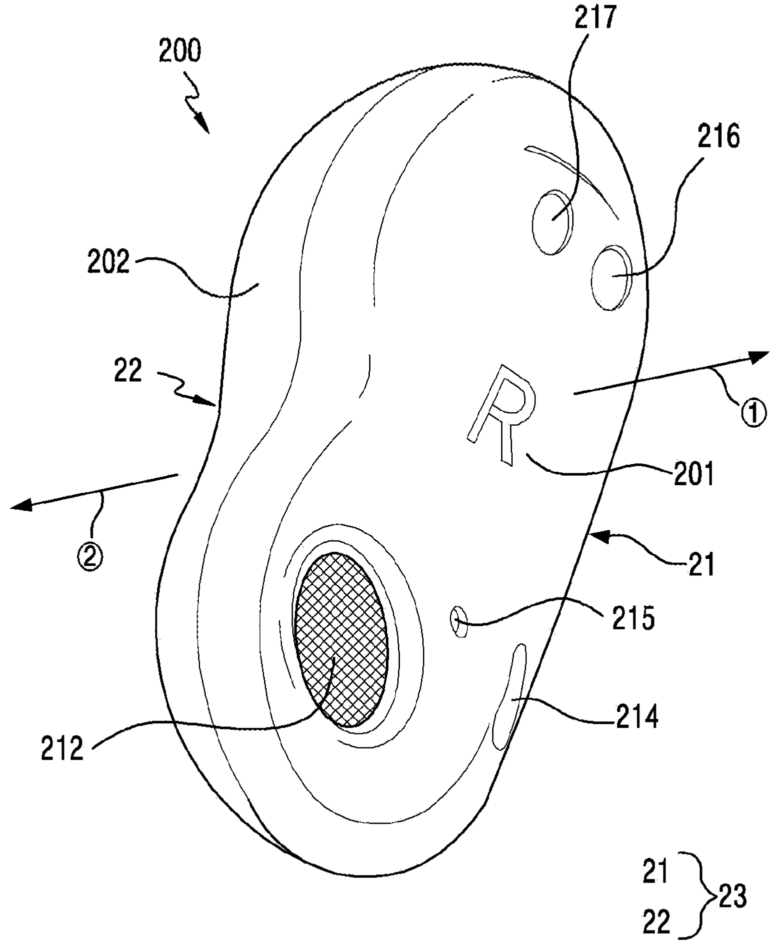
FIG. 2A illustrates an example of a wireless communication device according to various embodiments.
Figure 2B:
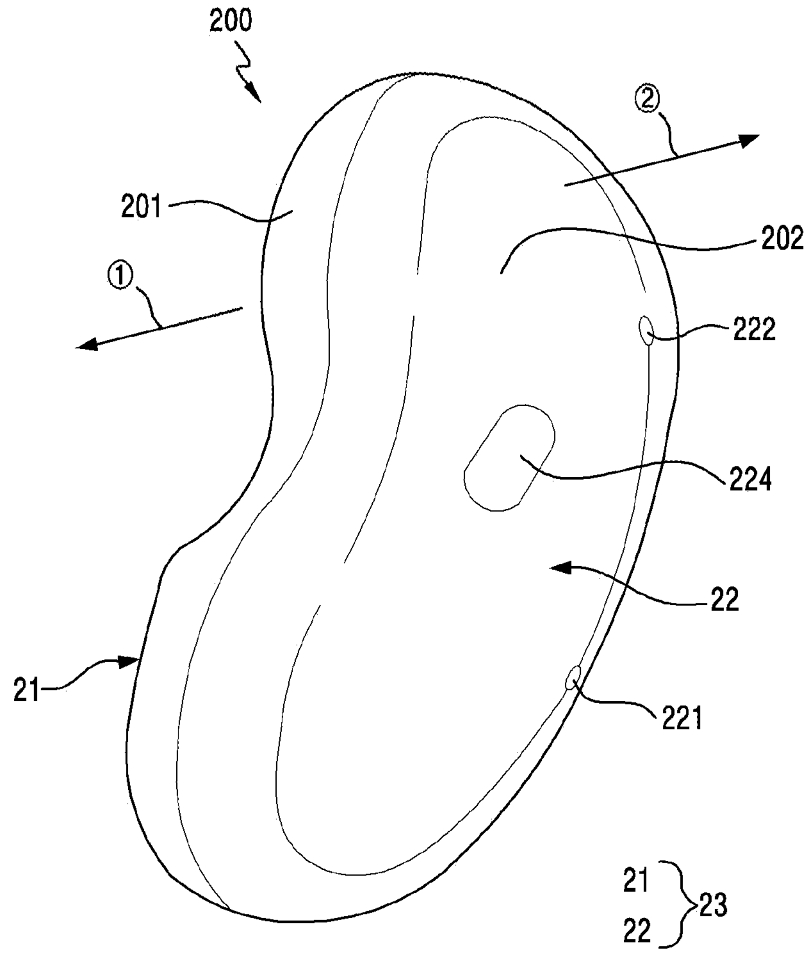
FIG. 2B illustrates an example of a wireless communication device according to various embodiments.
Figure 2C:
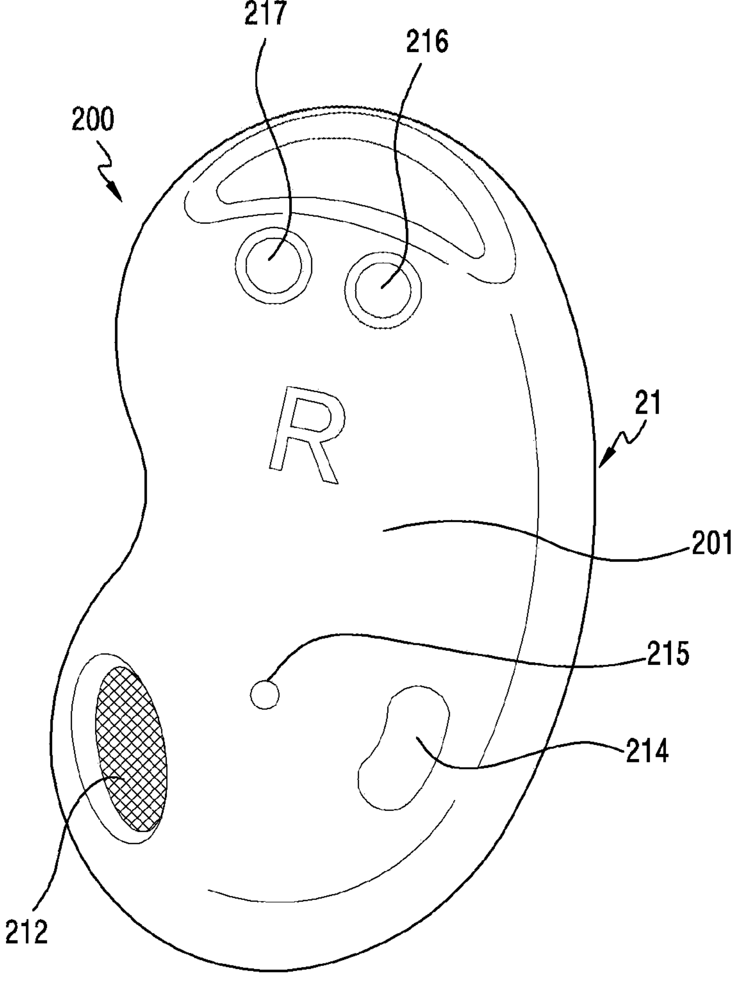
FIG. 2C illustrates an example of a wireless communication device according to various embodiments.
Figure 2D:
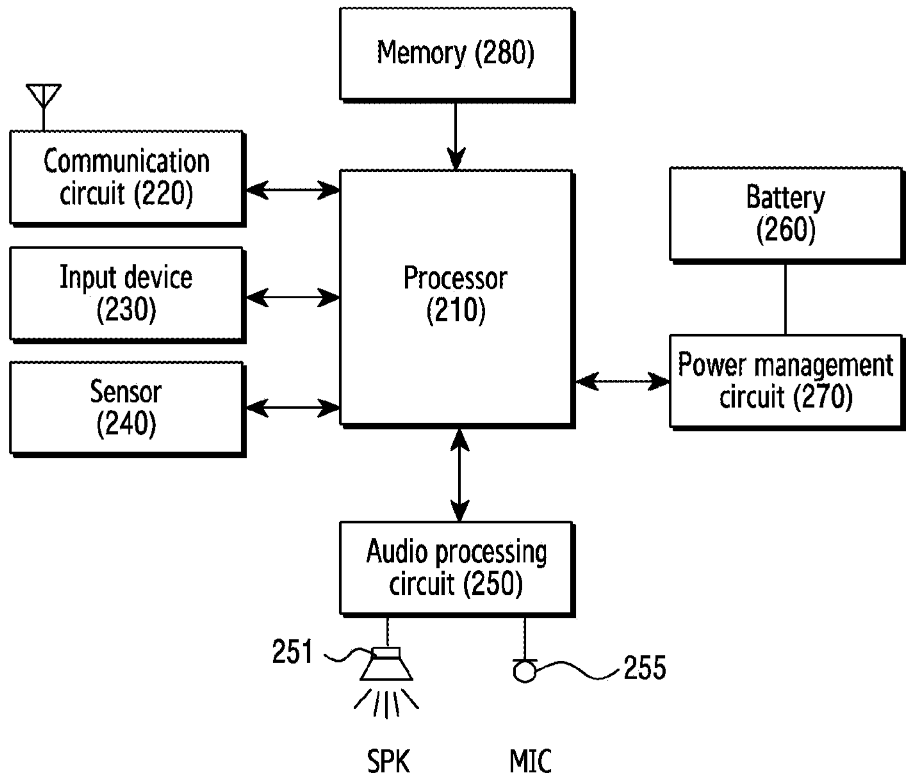
FIG. 2D is a block diagram of an example wireless communication device according to various embodiments.

FIG. 2A illustrates an example of a wireless communication device according to various embodiments. FIG. 2B illustrates an example of a wireless communication device according to various embodiments. FIG. 2C illustrates an example of a wireless communication device according to various embodiments. FIG. 2D is a block diagram of an example wireless communication device according to various embodiments. A wireless communication device 200 illustrated in FIGS. 2A, 2B, 2C, and 2D may be a wearable device that is adapted or configured to be worn on an ear. The wireless communication device 200 may be a wearable device that is wearable on a user's ear, specifically, on an external part of the ear (external ear). For example, the wireless communication device 200 may be a right wireless earphone among a pair of wireless earphones (e.g., left wireless earphone and right wireless earphone).

FIG. 2A and FIG. 2B are perspective views of an exterior of an example wireless communication device 200 according to various embodiments. FIG. 2C is a plan view of an exterior of the example wireless communication device 200 according to various embodiments.

According to an embodiment, the wireless communication device 200 may be a wearable device worn on the right ear. The wireless communication device 200 may include a first surface 201 and a second surface 202. The English letter "R" indicating that the wireless communication device 200 is a wearable device for wearing on the right ear may be provided on the first surface 201. Although not illustrated in FIG. 2A, an electronic device that is paired with the wireless communication device 200 and is worn on the left ear may have the English letter "L" indicating a wearable device for wearing on the left ear, provided on a surface corresponding to the first surface 201 of the wireless communication device 200.

According to an embodiment, the wireless communication device 200 may include a housing 23 in which multiple components are mounted. The housing 23 may include a first housing 21 including the first surface 201 facing a first direction ①, and a second housing 22 including the second surface 202 facing a second direction ②. The first direction ① and the second direction ② may be opposite to each other. For example, a part of the first surface 201 and the second surface 202 may include a curved surface.

According to an embodiment, the first surface 201 of the first housing 21 may include a speaker nozzle part (or an audio port including a sound hole) 212, a first port 214, and one or more charging terminals 216 and 217. Sound output from a speaker disposed in the housing 23 may be output to the outside via the audio port 212 including the sound hole.

According to an embodiment, the speaker nozzle part 212 may be disposed on one surface (e.g., the first surface 201 or the second surface 202) of the housing 23 so that sound output from a speaker disposed in the housing 23 is output (or propagated) to the outside of the wireless communication device 200 via audio ports arranged on the one surface (e.g., the first surface 201 or the second surface 202) of the housing 23. For example, the speaker nozzle part 212 may be disposed on the first surface 201 of the first housing 21 so that sound output from a speaker disposed in the housing 23 is output (or propagated) to the outside of the wireless communication device 200 via one or more audio ports arranged on the first surface 201 of the first housing 21. The speaker nozzle part 212 may include one or more opening parts, and may be made of at least one of a metallic material or a polymer material. The speaker nozzle part 212 may include a foreign material prevention member which prevents foreign materials (e.g., dust or moisture) from being introduced into the interior of the housing. The speaker nozzle part 212 may be exposed to the outside of the wireless communication device 200 through at least a part of the first surface 201.

According to an embodiment, the first port 214 may include a leakage port. The first port 214 may be exposed to the outside of the wireless communication device 200 through at least a part of the first surface 201.

According to an embodiment, the one or more charging terminals 216 and 217 may be arranged as a pair on one surface (e.g., the first surface 201 or the second surface 202) of the housing 23, and may be exposed to the outside of the wireless communication device 200 through the one surface. For example, the one or more charging terminals 216 and 217 may be exposed to the outside of the wireless communication device 200 through the first surface 201 of the housing 23.

According to an embodiment, the wireless communication device 200 may include a sensor (e.g., a proximity sensor or a biometric recognition sensor) which senses whether the wireless communication device 200 is worn by a user. A sensor window 215 may be disposed on one surface (e.g., the first surface 201 or the second surface 202) of the housing 23. For example, the sensor window 215 may be disposed on the first surface 201 of the first housing 21. For example, the sensor window 215 may be disposed between the speaker nozzle part 212 and the first port 214. The position of the sensor window 215 is not limited to the above example. The sensor window 215 may be understood as an opening part for operation of a sensor to sense whether the wireless communication device 200 is worn by a user.

According to an embodiment, the second surface 202 of the second housing 22 may include one or more microphone holes 221 and 222 and a second port 224.

According to an embodiment, the one or more microphone holes 221 and 222 may be arranged on one surface (e.g., the first surface 201 or the second surface 202) of the housing 23 so that a microphone disposed in the housing 23 obtains sound. For example, the one or more microphone holes 221 and 222 may be arranged on the second surface 202 of the second housing 22 so that a microphone disposed in the housing 23 obtains sound.

According to an embodiment, the second port 224 is a port related to output of a speaker, and may be understood as a port used for low-pass characteristic tuning of the speaker. The second port 224 may be disposed in a speaker back volume space facing the second direction ②.

According to an embodiment, at least a part of the description given with reference to FIGS. 2A, 2B, and 2C under the precondition that the wireless communication device 200 is a wearable device worn on the right ear, may be applied to even a case in which the wireless communication device 200 is a wearable device worn on the left ear, in the same way, based on a symmetrical characteristic.

FIG. 2D is a block diagram of the example wireless communication device 200 according to various embodiments. Elements illustrated in FIG. 2D may be included in the wireless communication device 200. Although not illustrated, a counterpart wireless communication device that is paired with the wireless communication device 200 and is worn on the opposite ear may also include elements corresponding to the wireless communication device 200.

Referring to FIG. 2D, the wireless communication device 200 may include a processor 210 (e.g., including processing circuitry), a communication circuit 220, an input device 230, a sensor 240, an audio processing circuit 250, a speaker 251, a microphone 255, a battery 260, a power management circuit 270, a memory 280, or a combination thereof. Although not illustrated in FIG. 2D, the wireless communication device 200 may include at least one connector for electrical connection to a power supply device (e.g., cradle).

In an embodiment, the processor 210 may control overall operations of the wireless communication device 200. The processor 210 may receive data of other elements (e.g., the communication circuit 220, the input device 230, the audio processing circuit 250, the power management circuit 270, or the memory 280), analyze the received data, and perform operations (e.g., calculation) according to the analyzed data.

In an embodiment, the processor 210 may control the communication circuit 220 such that the wireless communication device 200 establishes a wireless communication link (e.g., Bluetooth pairing) with the electronic device 100. In an embodiment, the wireless communication link may refer, for example, to a wireless communication link through which the wireless communication device 200 and the electronic device 100 are able to perform bi-directional communication. The wireless communication link between the wireless communication device 200 and the electronic device 100 may, for example, be referred to as a first communication link. A wireless communication link between a counterpart wireless communication device and the electronic device 100 may, for example, be referred to as a second communication link. A wireless communication link between the wireless communication device and the counterpart wireless communication device may, for example, be referred to as a third communication link.

In an embodiment, the processor 210 may receive data from the electronic device 100 using the communication circuit 220, and may transmit, to the electronic device 100, a response (e.g., ACK or NACK) indicating whether the data has been successfully received.

In an embodiment, when wireless communication between the wireless communication device 200 and the electronic device 100 is established, the processor 210 may allow the wireless communication device 200 to receive data from the electronic device 100 using the communication circuit 220. In an embodiment, the data received from the electronic device 100 may be data including an audio signal or information for matching with another wireless communication device.

In an embodiment, the processor 210 may provide data from the electronic device 100 to the audio processing circuit 250. In an embodiment, the audio processing circuit 250 may convert (e.g., decode) the provided data into an audio signal, and output the converted audio signal via the speaker 251.

In an embodiment, the processor 210 may obtain (or identify) a wireless communication parameter related to a wireless communication link. In an embodiment, the processor 210 may store the obtained (or identified) communication parameter in the memory 280. In an embodiment, the processor 210 may transfer a wireless communication parameter to a counterpart wireless communication device via a cradle to which the wireless communication device 200 is mounted. In an embodiment, when a separate wireless communication link (e.g., a third communication link) is established, the processor 210 may transmit a communication parameter to a counterpart electronic device through the same link.

In an embodiment, the wireless communication parameter may include address information (e.g., a BLUETOOTH address of a master device (e.g., the wireless communication device 200), a BLUETOOTH address of a slave device (e.g., a counterpart wireless communication device), and a BLUETOOTH address of a user device (e.g., the electronic device 100)), piconet clock information (e.g., the clock native (CLKN) of a master device (e.g., the wireless communication device 200)), information assigned by a logical transport (LT) address information master device (e.g., the wireless communication device 200), used channel map information, link key information, service discovery protocol (SDP) information (e.g., service and/or profile information associated with a first communication link (or a second communication link)), and/or supported feature information. In an embodiment, the wireless communication parameter may further include an extended inquiry response (EIR) packet. In an embodiment, the EIR packet may further include information on a manufacturer and/or resource control information on a first communication link (or a second communication link).

In an embodiment, the processor 210 may transmit a mode parameter to a counterpart wireless communication device via a cradle electrically connected to the wireless communication device 200 via a connector, or through establishment of separate wireless communication. In an embodiment, the mode parameter may include information on a sound effect or an audio filter applied to an audio signal corresponding to data received from the electronic device 100, when the audio signal is output via the speaker 251. In an embodiment, the mode parameter may include information on audio output strength or audio output magnitude applied to the audio signal. In an embodiment, the mode parameter may include information on a configuration of an application running in the electronic device 100 in relation to data. In an embodiment, the mode parameter may include information on a channel of data (e.g., in a case of a stereo audio signal, information on a left (L) channel and information on a right (R) channel).

In an embodiment, the processor 210 may transmit a wireless communication establishment list to a counterpart wireless communication device via a cradle electrically connected to the wireless communication device 200 via a connector, or through establishment of separate wireless communication (e.g., a third communication link). In an embodiment, the wireless communication establishment list may include a history of wireless communication establishment between multiple wireless communication devices (not illustrated), an order of wireless communication establishment, or a combination thereof.

In an embodiment, the processor 210 may receive a wireless communication parameter, a mode parameter, a wireless communication establishment list, or a combination thereof from a counterpart wireless communication device via a cradle electrically connected to the wireless communication device 200 via a connector, or through establishment of separate wireless communication (e.g., a third communication link).

In an embodiment, when a wireless communication link is established between a counterpart wireless communication device and the electronic device 100, the processor 210 may receive at least a part of data from the electronic device 100 from the counterpart wireless communication device via a cradle electrically connected to the wireless communication device 200 via a connector, or through a separate wireless communication link.

In an embodiment, the processor 210 may output, via the speaker 251, data received from a counterpart wireless communication device via a cradle electrically connected to the wireless communication device 200 via a connector, or through a separate wireless communication link (e.g., a third communication link).

In an embodiment, the processor 210 may output, via the speaker 251, data obtained from the electronic device 100. In an embodiment, the processor 210 may convert (e.g., decode) data obtained using the audio processing circuit 250, into an audio signal, and output the converted audio signal via the speaker 251. In an embodiment, the processor 210 may output, via the speaker 251, an audio signal related to one channel (e.g., R channel) or all channels (e.g., L channel and R channel) allocated to the wireless communication device 200 among converted audio signals according to configuration information of the wireless communication device 200.

In an embodiment, the communication circuit 220 may establish wireless communication links between the wireless communication device 200, and a counterpart wireless communication device and the electronic device 100. In an embodiment, the communication circuit 220 may receive data from the counterpart wireless communication device and the electronic device 100 through the established wireless communication links. In an embodiment, the communication circuit 220 may transmit data from the counterpart wireless communication device or the electronic device 100 through the established wireless communication links.

In an embodiment, the input device 230 may receive an input from a user. In an embodiment, the input received from the user may be an input to adjust the volume of an audio signal output via the wireless communication device 200, or to reproduce the next music (e.g., a different song).

In an embodiment, the input device 230 may include a touch panel. In an embodiment, the input device 230 may detect a touch input, a swipe input, a flick input, or a hovering input by means of the touch panel. In an embodiment, the input device 230 may include a physical key.

In an embodiment, the input device 230 may provide data indicating an input received from a user to the processor 210.

In an embodiment, the sensor 240 may generate a sensing value for identification of a communication establishment event. In an embodiment, the communication establishment event may include application of the wireless communication device, attachment or detachment of the wireless communication device to or from the cradle, use of the wireless communication device, a gesture input, or a combination thereof.

In an embodiment, the audio processing circuit 250 may process a signal related to sound. In an embodiment, the audio processing circuit 250 may obtain a sound signal (e.g., a voice signal of a user) via the microphone 255. In an embodiment, the audio processing circuit 250 may convert a sound signal obtained via the microphone 255 into an analog audio signal (or an electrical signal) corresponding to the sound signal. In an embodiment, the audio processing circuit 250 may encode an analog audio signal to be a digital audio signal using a codec. In an embodiment, the audio processing circuit 250 may provide a digital audio signal to other elements (e.g., the processor 210, the communication circuit 220, and/or the memory 280) of the wireless communication device 200.

In an embodiment, the audio processing circuit 250 may receive a digital audio signal from other elements (e.g., the processor 210, the communication circuit 220, an interface, and/or the memory 280) of the wireless communication device 200. In an embodiment, the audio processing circuit 250 may convert a digital audio signal to be an analog audio signal via a converter (e.g., digital-to-analog converter (DAC)). In an embodiment, the audio processing circuit 250 may decode a digital audio signal to be an analog audio signal using a codec. In an embodiment, the audio processing circuit 250 may output a sound signal corresponding to an analog audio signal via the speaker 251.

In an embodiment, the battery 260 may supply power to at least one element of the wireless communication device 200. In an embodiment, the battery 260 may be charged when the wireless communication device 200 is mounted (or electrically connected) to a designated power supply device (e.g., a cradle) via a connector (not illustrated).

In an embodiment, the power management circuit 270 may manage power supplied to the wireless communication device via the battery 260. In an embodiment, the power management circuit 270 may be configured as at least a part of a power management integrated circuit (PMIC).

In an embodiment, the power management circuit 270 may measure the power amount of the battery 260 of the wireless communication device 200. In an embodiment, the power management circuit 270 may provide information on the power amount of the battery 260 to the processor 210. In an embodiment, the processor 210 may transmit information on the remaining power of the battery 260 of the wireless communication device 200 to the electronic device 100. In an embodiment, the power amount of the battery 260 of the wireless communication device 200 may be used for the wireless communication device 200 to conduct a negotiation related to a master device with a counterpart wireless communication device. In an embodiment, one device among the wireless communication device 200 and a counterpart wireless communication device may be determined as a master device, based on the power amounts of the wireless communication device 200 and the counterpart wireless communication device, and the other electronic device may be determined as a slave device.

Figure 3A:
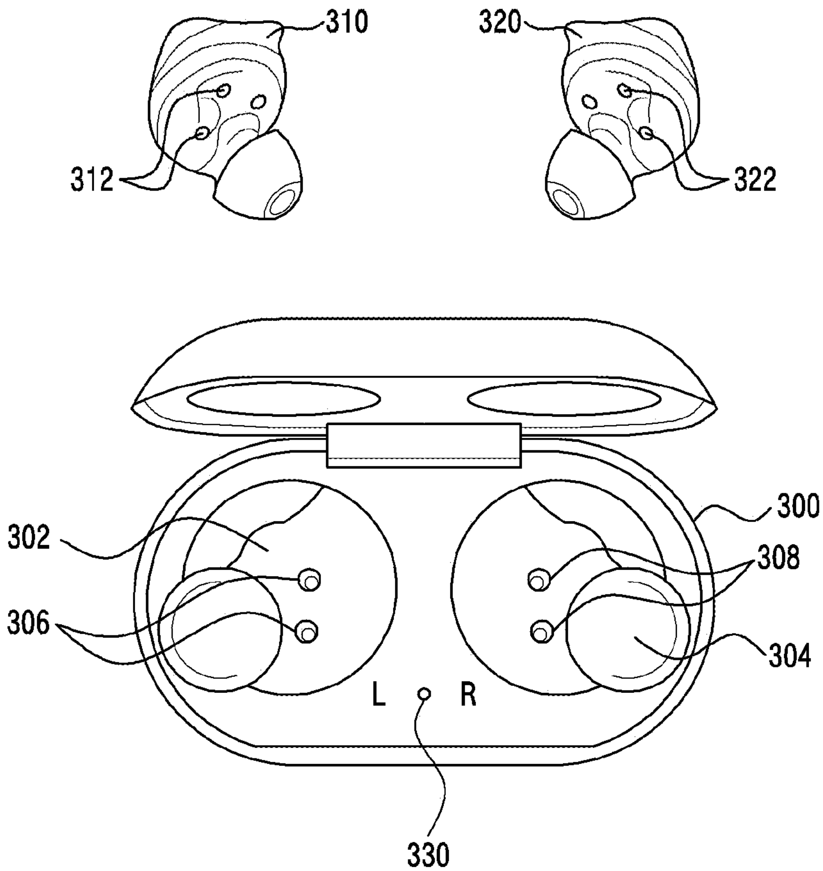
FIG. 3A illustrates an example of a cradle and a wireless communication device according to various embodiments.

FIG. 3A illustrates an example of a cradle and a wireless communication device according to various embodiments. A cradle 300 may be a device which is electrically connected to a wireless communication device, and performs a function such as battery supply or data transfer to the wireless communication device. In the following description, the cradle may be called a charging holder, a case, or a power supply device. Wireless communication devices 310 and 320 illustrated in FIG. 3 may each be a device corresponding to the wireless communication device 200 in FIG. 2.

Referring to FIG. 3, the cradle 300 may include a first accommodation part 302 in which the first wireless communication device 310 is mounted, and a second accommodation part 304 in which the second wireless communication device 320 is mounted. In an embodiment, a first connector 306 including at least one terminal may be disposed on a bottom surface of the first accommodation part 302. In an embodiment, a second connector 308 including at least one terminal may be disposed on a bottom surface of the second accommodation part 304.

In an embodiment, the first connector 306 and the second connector 308 may include a pogo (spring-loaded) pin. In an embodiment, the first connector 306 and the second connector 308 may include at least one of a charging power terminal, a ground (GND) terminal, a detection terminal, or a data communication terminal. In an embodiment, at least one terminal of the first connector 306 and the second connector 308 may perform two or more functions among functions of a charging power terminal, a detection terminal, or a data communication terminal. For example, at least one terminal included in the first connector 306 may detect that the first wireless communication device 310 is mounted in the first accommodation part 302, charge the first wireless communication device 310, and perform data communication with the first wireless communication device 310.

In an embodiment, the cradle 300 may include a LED indicator lamp 330. In an embodiment, the LED indicator lamp 330 may output a signal when the first wireless communication device 310 or the second wireless communication device 320 is mounted in at least one of the first accommodation part 302 or the second accommodation part 304. For example, when the first wireless communication device 310 is mounted in the first accommodation part 302, a signal (e.g., green light or red light) indicating a charging state (e.g., charging is completed or the device is charging) of the first wireless communication device 310 may be output. In an embodiment, the cradle 300 may include multiple LED indicator lamps 330.

In an embodiment, the first wireless communication device 310 may be supplied with power from the cradle 300 via a connector 312. In an embodiment, the second wireless communication device 320 may be supplied with power from the cradle 300 via a connector 322. In an embodiment, the first wireless communication device 310 and the second wireless communication device 320 may transmit data to the cradle 300 via the connectors 312 and 322, respectively. For example, the first wireless communication device 310 may transmit, to the cradle 300, data including a state of charge (SOC) of the first wireless communication device. In addition, for example, the first wireless communication device 310 may transmit, to the cradle 300, a matching start signal for matching between the first wireless communication device 310 and the second wireless communication device 320.

Figure 3B:
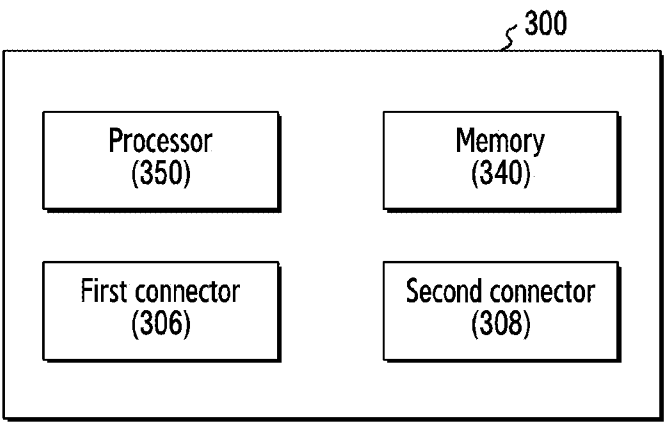
FIG. 3B is a block diagram of an example cradle according to various embodiments.

FIG. 3B is a block diagram of the cradle 300 according to an embodiment.

Referring to FIG. 3B, the cradle 300 may include a processor 350 (e.g., including processing circuitry), a memory 340, a first connector 306, and a second connector 308.

In an embodiment, the first connector 306 may perform electrical connection between the cradle 300 and the first wireless communication device 310. In an embodiment, the second connector 308 may perform electrical connection between the cradle 300 and the second wireless communication device 320.

In an embodiment, the cradle 300 may control power of the cradle 300 via the processor 350. For example, the processor 350 may charge a battery (not illustrated) according to sensing that power is applied via an external power interface (not illustrated). In addition, for example, the processor 350 may control charging of the first wireless communication device 310 and the second wireless communication device 320. In addition, for example, the processor 350 may charge the first wireless communication device 310 and the second wireless communication device 320 according to sensing that power is applied from an external power device.

In an embodiment, data received from the first wireless communication device 310 and/or the second wireless communication device 320 may be stored in the memory 340.

In an embodiment, the processor 350 may transmit and receive data to and from the first wireless communication device 310 via the first connector 306. In an embodiment, the processor 350 may transmit and receive data to and from the second wireless communication device 320 via the second connector 308. In an embodiment, the data may include at least one of a battery state, matching identification information, capability information on a wireless communication device, a matching start signal, or a reboot command, and is not limited thereto.

In an embodiment, the processor 350 may detect whether the first wireless communication device 310 is mounted, by means of the first connector 306, and detect whether the second wireless communication device 320 is mounted, by means of the second connector 308. For example, the processor 350 may sense a change in a resistance value by means of the first connector 306, so as to detect whether the first wireless communication device 310 is mounted. In addition, for example, the processor 350 may determine, by means of a sensor (not illustrated), whether the first wireless communication device 310 is electrically connected to the cradle 300 via the first connector 306.

In an embodiment, the cradle 300 may control power of the cradle 300 via the processor 350. For example, the processor 350 may charge a battery (not illustrated) according to sensing that power is applied via an external power interface (not illustrated). In addition, for example, the processor 350 may control charging of the first wireless communication device 310 and the second wireless communication device 320. In addition, for example, the processor 350 may charge the first wireless communication device 310 and the second wireless communication device 320 according to sensing that power is applied from an external power device.

Various embodiments of the disclosure relate to a device for matching (or coupling) wireless communication devices using BLUETOOTH, and a method therefor. The wireless communication devices may include a truly wireless stereo (TWS) product.

In the following description, "matching" may refer, for example, to a pair of independent wireless communication electronic devices being wirelessly connected to each other to provide a same service. In other words, "matching" may indicate two or more independent wireless communication devices (e.g., the first wireless communication device 310 and the second wireless communication device 320) being connected to each other to operate as one set. In addition, in the following description, "pairing" may indicate establishment of a wireless communication link between the electronic device 101 and a wireless communication device (e.g., the first wireless communication device 310 and the second wireless communication device 320).

In an embodiment, the first wireless communication device 310 and the second wireless communication device 320 may be able to be matched ("matchable") to each other. For example, the first wireless communication device 310 and the second wireless communication device 320 may be a pair of earbuds.

In an embodiment, the first wireless communication device 310 and the second wireless communication device 320 may have information on different channel directions. For example, when the first wireless communication device 310 is the left device, the second wireless communication device 320 may be the right device.

In an embodiment, when the first wireless communication device 310 and the second wireless communication device 320 perform matching, the first wireless communication device 310 may store information identifying the second wireless communication device 320 as a counterpart device, and the second wireless communication device 320 may store information identifying the first wireless communication device 310 as a counterpart device. For example, the first wireless communication device 310 may store a Bluetooth address (BD_ADDR) of the second wireless communication device 320 in a peer area of the memory 280 of the first wireless communication device 310, and the second wireless communication device 320 may store a Bluetooth address of the first wireless communication device 310 in a peer area of a memory of the second wireless communication device 320. In an embodiment, when there is no counterpart device matched to a wireless communication device, a peer area of a memory may have an identifier (e.g., a Bluetooth address) of the wireless communication device. That is, a device identifier included in a local area and a device identifier included in a peer area may be the same as the identifier of a wireless communication device.

Matching between wireless communication devices operating as one set may be performed in a product production process. However, when, for example, one of the wireless communication devices included in one set is broken or lost, one device corresponding to a broken or lost device is required to be matched to the other (remaining or operable) device of the set. In order to match a wireless communication device (hereinafter, referred to as an "existing device") carried by a user with a new device (hereinafter, referred to as a "new device"), the user may visit a service center, or perform a predetermined manipulation on a cradle, the existing device, and the new device in a state in which the existing device and the new device are placed in the cradle, thereby matching the devices into one set. For example, when left and right matching between wireless communication devices is performed, a user may push a touch area (e.g., the sensor window 215 or the first port 214) of each of the wireless communication devices for a predetermined time (e.g., 10 seconds) or longer until a time point at which the matching is completed in a state in which the wireless communication devices are placed in a cradle. When a state of the user's touch is not good, and the connection between a wireless communication device and the cradle is not good (e.g., a contact point with a pogo pin is disconnected in the middle of the process), the left and right matching may fail. For this reason, matching of a wireless communication device may be difficult and inconvenient.

An example wireless communication device and an example operation method thereof according to various embodiments of the disclosure may provide an intuitive user interface to a user so as to provide matching between wireless communication devices via the same interface.

Figure 4:
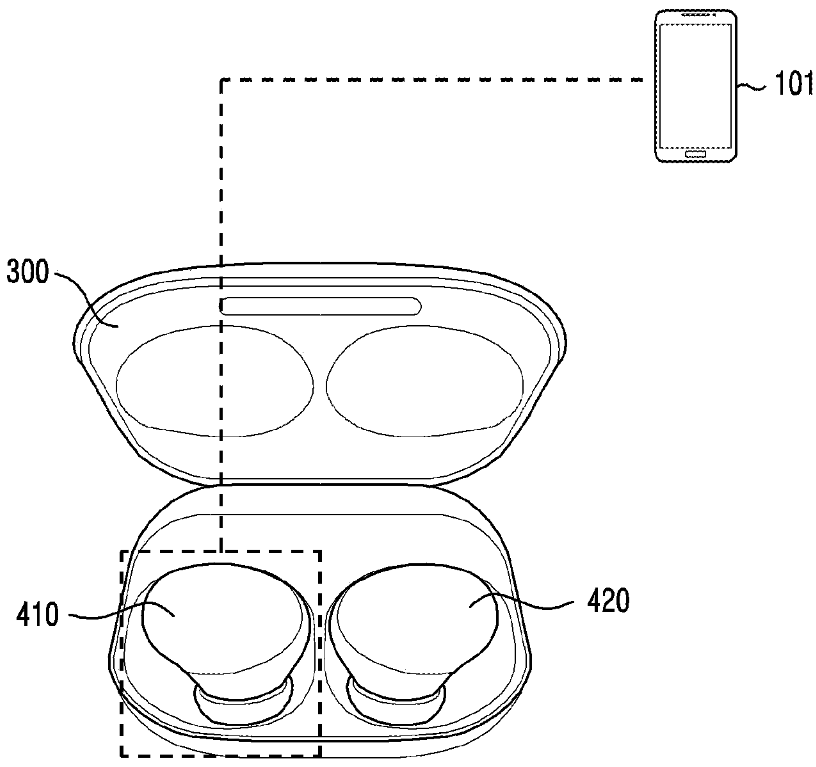
FIG. 4 illustrates an example of matching between wireless communication devices according to various embodiments.

FIG. 4 illustrates an example of matching between wireless communication devices according to various embodiments. A first wireless communication device 410 and a second wireless communication device 420 illustrated in FIG. 4 may each be a device corresponding to the wireless communication device 200 in FIG. 2. The first wireless communication device 410 illustrated in FIG. 4 may be a device corresponding to the first wireless communication device 310 in FIG. 3A, and the second wireless communication device 420 may be a device corresponding to the second wireless communication device 320 in FIG. 3A.

Referring to FIG. 4, matching between wireless communication devices may be performed in a state in which the wireless communication devices are placed in a cradle. The first wireless communication device 410 may be a wireless communication device carried by a user (e.g., an existing device), and the second wireless communication device 420 may be a new wireless communication device (e.g., new device).

In an embodiment, in a state in which the first wireless communication device 410 and the second wireless communication device 420 are placed in the cradle 300, a communication link may be established between the first wireless communication device 410 and the electronic device 101.

In an embodiment, when a user input to perform matching is received from a user via a user interface for matching displayed on the electronic device 101, matching may be performed through a series of operations between the first wireless communication device 410, the second wireless communication device 420, and the cradle 300.

In an embodiment, when matching between the first wireless communication device 410 and the second wireless communication device 420 is completed, a signal indicating completion of matching may be transferred from the first wireless communication device 410 (or the second wireless communication device 420) to the electronic device 101. The electronic device 101 may display a user interface including information indicating completion of matching, in response to a matching completion signal.

Figure 5:
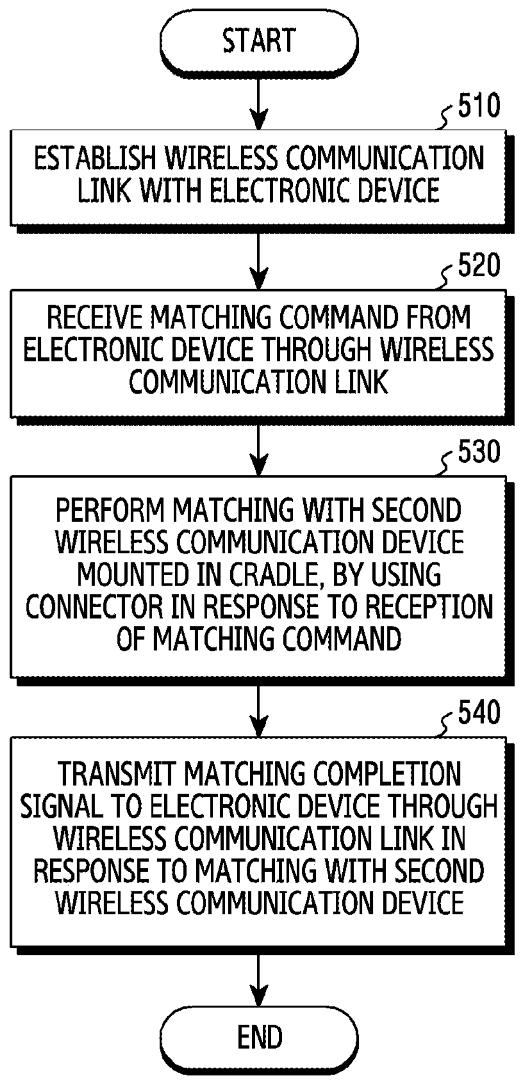
FIG. 5 is a flowchart of example operations of a first wireless communication device according to various embodiments.

FIG. 5 is a flowchart of example operations of a first wireless communication device according to various embodiments. A first wireless communication device in FIG. 5 may be a device corresponding to the first wireless communication device 410 in FIG. 4. A second wireless communication device in FIG. 5 may be a device corresponding to the second wireless communication device 420 in FIG. 4. A cradle in FIG. 5 may be a device corresponding to the cradle 300 in FIG. 3. An electronic device in FIG. 5 may be a device corresponding to the electronic device 101 in FIG. 1. One of the first wireless communication device and the second wireless communication device may operate as a master device, and the other one may operate as a slave device. In the following description, a case in which the first wireless communication device operates as a master device is explained as an example, but this case merely corresponds to an example, and the second wireless communication device may also operate as a master device.

According to an embodiment, in operation 510, the first wireless communication device 410 may establish a wireless communication link with the electronic device.

In an embodiment, the first wireless communication device 410 may transmit signals for Bluetooth connection to adjacent devices. The electronic device may scan a signal transmitted from the first wireless communication device 410. The electronic device may transmit a Bluetooth connection request signal to the first wireless communication device 410. Accordingly, a wireless communication link between the electronic device and the first wireless communication device 410 may be established. The wireless communication link between the electronic device and the first wireless communication device 410 may be called a first communication link. While a Bluetooth connection is described, the disclosure is not limited in this respect and connections using other wireless protocols may also be used.

In an embodiment, data may be transmitted and received between the electronic device and the first wireless communication device 410 through the wireless communication link. For example, the first wireless communication device 410 may receive an audio signal from the electronic device through the first communication link. In addition, for example, the first wireless communication device 410 may transmit information on a battery state of the first wireless communication device 410 to the electronic device 101 through the wireless communication link. In addition, for example, the first wireless communication device 410 may transmit device capability information (e.g., channel direction information, supported audio system information, and information on a matched counterpart device) on the first wireless communication device 410 to the electronic device 101 through the wireless communication link.

In an embodiment, the first wireless communication device 410 may receive, from the electronic device 101 through the wireless communication link, information related to wireless communication establishment of the electronic device 101 (e.g., information on a wireless communication device (e.g., the first wireless communication device 410) currently paired with the electronic device 101, information on a pairing history of the electronic device 101, and information on a counterpart device matched to a currently paired wireless communication device (e.g., the first wireless communication device 410)).

In an embodiment, the first wireless communication device 410 may receive role information (e.g., master or slave) on the first wireless communication device 410 from the electronic device 101 through the wireless communication link.

According to an embodiment, in operation 520, the first wireless communication device 410 may receive a matching command from the electronic device through the wireless communication link. The matching command may indicate a signal for triggering matching between the first wireless communication device 410 and the second wireless communication device 420.

In an embodiment, the electronic device may transmit the matching command to the first wireless communication device 410 in response to reception of a user input related to a matching start via a user interface displayed on the electronic device.

In an embodiment, the matching command may include information required for matching between the first wireless communication device 410 and the second wireless communication device 420. For example, the matching command may include capability information (e.g., channel direction information and supportable audio channel information) on the first wireless communication device 410.

In an embodiment, although not illustrated, before operation 520, the first wireless communication device 410 and the second wireless communication device 420 may each be placed in the cradle 300. For example, the connector 312 (FIG. 3A) of the first wireless communication device 410 may be electrically connected to the first connector 306 of the cradle 300, and the connector 322 (FIG. 3A) of the second wireless communication device 420 may be electrically connected to the second connector 308 of the cradle 300.

In an embodiment, although not illustrated in the drawing, after the first wireless communication device 410 and the second wireless communication device 420 are each placed in the cradle 300, the first wireless communication device 410 and the second wireless communication device 420 may be supplied with power from the cradle 300.

According to an embodiment, in operation 530, the first wireless communication device 410 may perform matching with the second wireless communication device 420 mounted in the cradle 300, via the connector 312, in response to reception of the matching command.

In an embodiment, the first wireless communication device 410 may transmit a matching start signal to the cradle 300 via the connector 312. The matching start signal may refer, for example, to a signal indicating to start matching between the first wireless communication device 410 and the second wireless communication device 420.

In an embodiment, the first wireless communication device 410 may receive a request to transmit a matching identifier (hereinafter, referred to as "first matching identifier") of the first wireless communication device 410 from the cradle 300 via the connector 312. For example, the first wireless communication device 410 may receive a request to transmit a Bluetooth address (hereinafter, referred to as "first Bluetooth address") of the first wireless communication device 410 via the connector 312.

In an embodiment, the first wireless communication device 410 may transmit the first matching identifier to the cradle 300 in response to the request to transmit the matching identifier. For example, the first wireless communication device 410 may transmit the first Bluetooth address to the cradle 300.

In an embodiment, the first wireless communication device 410 may receive a matching identifier (hereinafter, referred to as "second matching identifier") of the second wireless communication device 420 from the cradle 300. For example, the first wireless communication device 410 may receive a Bluetooth address (hereinafter, referred to as "second Bluetooth address) of the second communication device from the cradle 300.

In an embodiment, the first wireless communication device 410 may store the second matching identifier received from the cradle 300 in the memory 280. For example, the first wireless communication device 410 may store the second Bluetooth address received from the cradle 300 in a peer area of the memory 280 of the first wireless communication device 410. The peer area of the memory may include an area in which an identifier of a device operating as part of the same one set with the wireless communication device is stored.

In an embodiment, the first wireless communication device 410 may transmit, to the cradle 300, a synchronization identifier (synced ID) received from the electronic device 101, in response to reception of, from the cradle 300, the request to transmit the matching identifier. The synchronization identifier may indicate an identifier randomly configured by the electronic device 101 to match wireless communication devices paired with the electronic device 101.

In an embodiment, the first wireless communication device 410 may transmit the synchronization identifier to the cradle 300, and receive the second matching identifier from the cradle 300. The first wireless communication device 410 may identify that the synchronization identifier transmitted to the cradle 300 corresponds to the second matching identifier received from the cradle 300. The first wireless communication device 410 may store the synchronization identifier in the memory in response to identification that the synchronization identifier transmitted to the cradle 300 corresponds to the second matching identifier received from the cradle 300.

In an embodiment, the first wireless communication device 410 may receive a reboot command from the cradle 300. For example, after passage of a predetermined time after the cradle 300 transmits the second matching identifier to the first wireless communication device 410, the first wireless communication device 410 may receive the reboot command from the cradle 300. In addition, for example, the first wireless communication device 410 may store the second Bluetooth address, and then notify the cradle 300 of completion of the storage, and according to the notification, the cradle 300 may transmit the reboot command to the first wireless communication device 410.

In an embodiment, the first wireless communication device 410 may perform rebooting in response to reception of the reboot command from the cradle 300. For example, according to storage of a new device identifier in the peer area of the memory of the first wireless communication device 410, the first wireless communication device 410 may perform rebooting for a smooth operation thereof.

In an embodiment, after the first wireless communication device 410 stores the Bluetooth address of the second wireless communication device 420 in the peer area of the memory 280, the first wireless communication device 410 and the second wireless communication device 420 may establish a wireless communication link (e.g., a third communication link) therebetween. For example, the first wireless communication device 410 and the second wireless communication device 420 may automatically establish a Bluetooth connection link. In addition, the first wireless communication device 410 and the second wireless communication device 420 may establish a wireless communication link and perform synchronization (e.g., transmit and receive the synchronization identifier (synced ID)).

In an embodiment, the first wireless communication device 410 may transmit color information on the first wireless communication device 410 to the cradle 300. For example, the color information on the first wireless communication device 410 may include first color information. In an embodiment, the first wireless communication device 410 may receive color information on the second wireless communication device 420 from the electronic device 101.

For example, the color information on the second wireless communication device 420 may include second color information. The first color information and the second color information may be the same or different from each other.

According to an embodiment, in operation 540, the first wireless communication device 410 may transmit a matching completion signal to the electronic device through the wireless communication link in response to matching with the second wireless communication device 420.

In an embodiment, the matching completion signal may include information on a matched counterpart wireless communication device thereto. For example, the first wireless communication device 410 may receive a matching completion signal including the second Bluetooth address.

In an embodiment, after matching between the first wireless communication device 410 and the second wireless communication device 420 is completed, the first wireless communication device 410 and the second wireless communication device 420 may operate as one set.

Figure 6:
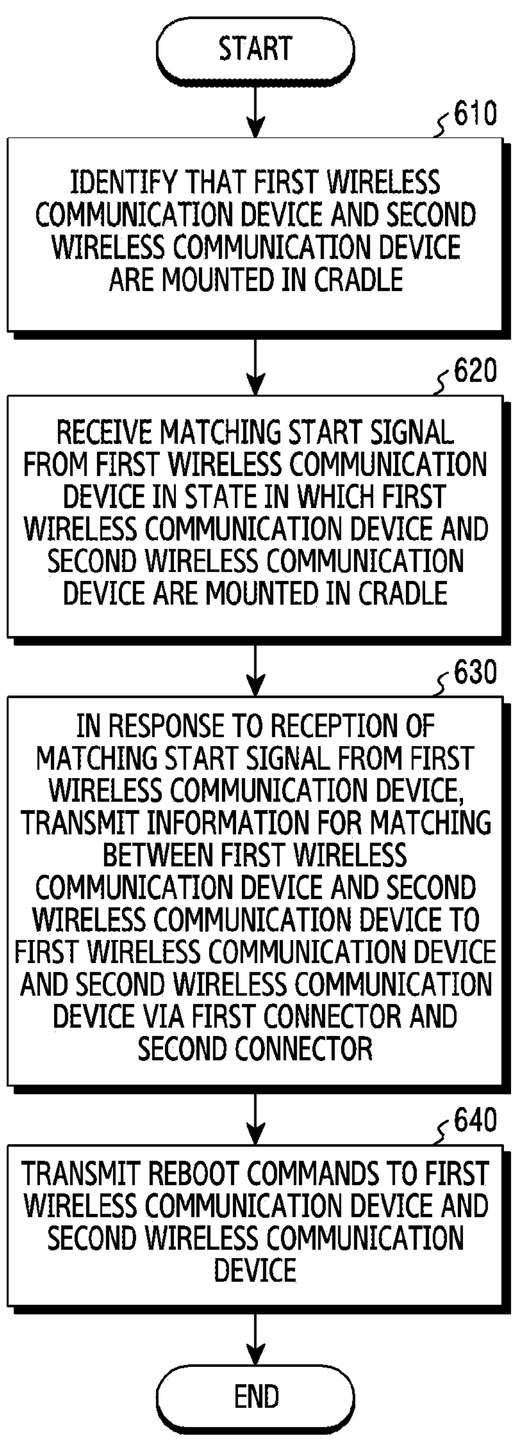
FIG. 6 is a flowchart of example operations of a cradle according to various embodiments.

FIG. 6 is a flowchart of example operations of a cradle according to various embodiments. A first wireless communication device in FIG. 6 may be a device corresponding to the first wireless communication device 410 in FIG. 4. A second wireless communication device in FIG. 6 may be a device corresponding to the second wireless communication device 420 in FIG. 4. A cradle in FIG. 6 may be a device corresponding to the cradle 300 in FIG. 3. An electronic device in FIG. 6 may be a device corresponding to the electronic device 101 in FIG. 1. One of the first wireless communication device and the second wireless communication device may operate as a master device, and the other one may operate as a slave device. In the following description, a case in which the first wireless communication device operates as a master device is explained as an example, but this case merely corresponds to an example, and the second wireless communication device may also operate as a master device.

According to an embodiment, in operation 610, the cradle 300 may identify that the first wireless communication device 410 and the second wireless communication device 420 are mounted in the cradle 300.

In an embodiment, the cradle 300 may identify that the first connector 306 is electrically connected to the connector 312 of the first wireless communication device 410, and identify that the second connector 308 of the cradle 300 is electrically connected to the connector 322 of the second wireless communication device 420. For example, the cradle 300 may sense a change in resistance values of the first connector 306 and the second connector 308, so as to identify that the first wireless communication device 410 and the second wireless communication device 420 are each electrically connected. In addition, for example, the first wireless communication device 410 and the second wireless communication device 420 being mounted in the cradle 300 may be identified via a sensor (not illustrated) of the cradle 300.

In an embodiment, although not illustrated in the drawing, the cradle 300 may supply power to the first wireless communication device 410 and the second wireless communication device 420 in response to identification that the first wireless communication device 410 and the second wireless communication device 420 are mounted in the cradle 300.

According to an embodiment, in operation 620, the cradle 300 may receive a matching start signal from the first wireless communication device 410 in the state in which the first wireless communication device 410 and the second wireless communication device 420 are mounted in the cradle 300. The matching start signal may refer, for example, to a signal indicating to start matching between the first wireless communication device 410 and the second wireless communication device 420.

According to an embodiment, in operation 630, the cradle 300 may, in response to reception of the matching start signal from the first wireless communication device 410, transmit information for matching between the first wireless communication device 410 and the second wireless communication device 420 to the first wireless communication device 410 and the second wireless communication device 420 via the first connector and the second connector, respectively.

In an embodiment, the information for matching may include a first matching identifier and a second matching identifier. For example, the information for matching may include a first Bluetooth address and a second Bluetooth address.

In an embodiment, the cradle 300 may receive color information on the first wireless communication device 410 from the first wireless communication device 410. In addition, the cradle 300 may receive color information on the second wireless communication device 420 from the second wireless communication device 420. For example, the color information on the first wireless communication device 410 may include first color information. For example, the color information on the second wireless communication device 420 may include second color information. The first color information and the second color information may be the same or different from each other.

In an embodiment, before performing operation 630, the cradle 300 may transmit matching identifier transmission requests to the first wireless communication device 410 and the second wireless communication device 420. For example, the cradle 300 may transmit a first matching identifier transmission request to the first wireless communication device 410, and may transmit a second matching identifier transmission request to the second wireless communication device 420. A matching identifier may include a Bluetooth address.

In an embodiment, before performing operation 630, the cradle 300 may receive the first matching identifier from the first wireless communication device 410 and receive the second matching identifier from the second wireless communication device 420.

In an embodiment, the cradle 300 may transmit the second matching identifier to the first wireless communication device 410 and transmit the first matching identifier to the second wireless communication device 420. In an embodiment, the cradle 300 may transmit the second Bluetooth address to the first wireless communication device 410 and transmit the first Bluetooth address to the second wireless communication device 420.

In an embodiment, a matching identifier may include a synchronization identifier received from the first wireless communication device 410.

According to an embodiment, in operation 640, the cradle 300 may transmit reboot commands to the first wireless communication device 410 and the second wireless communication device 420.

In an embodiment, at a time point after passage of a designated time after transmission of the information for matching, the cradle 300 may transmit the reboot commands to the first wireless communication device 410 and the second wireless communication device 420. In an embodiment, when a signal notifying storage of a matching identifier is received from each of the first wireless communication device 410 and the second wireless communication device 420, the cradle 300 may transmit the reboot commands to the first wireless communication device 410 and the second wireless communication device 420.

Figure 7:
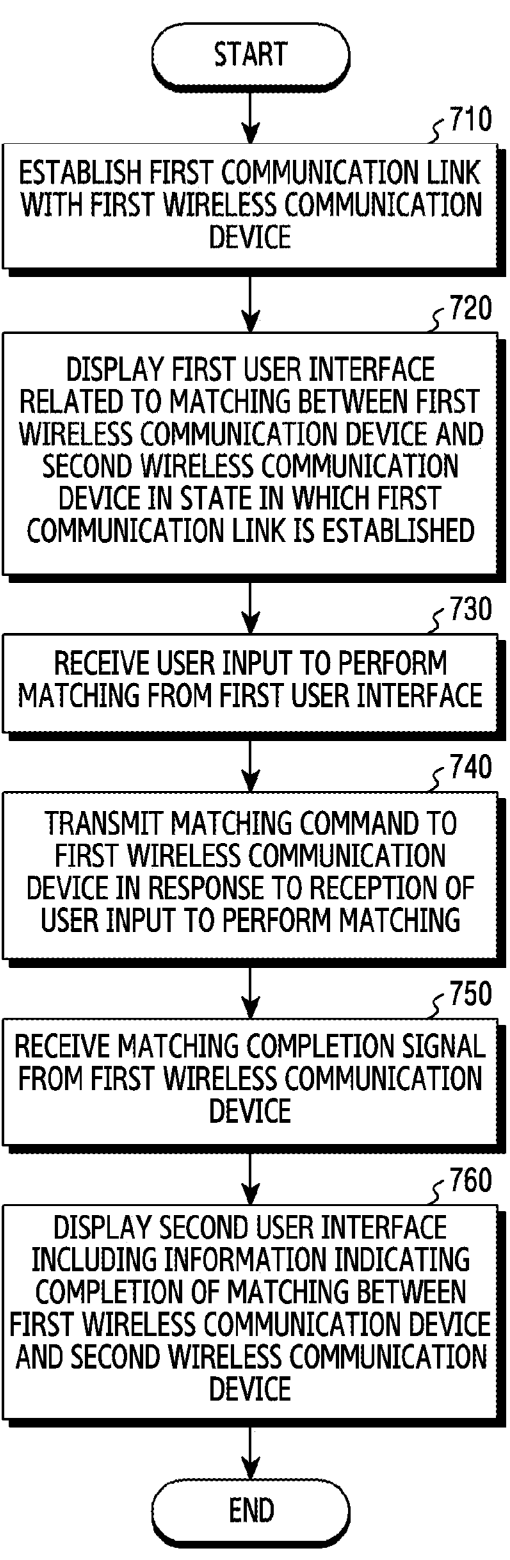
FIG. 7 is a flowchart of example operations of an electronic device according to various embodiments.

FIG. 7 is a flowchart of example operations of an electronic device according to various embodiments. The first wireless communication device 410 in FIG. 7 may be a device corresponding to the first wireless communication device 410 in FIG. 4. A second wireless communication device in FIG. 7 may be a device corresponding to the second wireless communication device 420 in FIG. 4. An electronic device in FIG. 7 may be a device corresponding to the electronic device 101 in FIG. 1. One of the first wireless communication device 410 and the second wireless communication device may operate as a master device, and the other one may operate as a slave device. In the following description, a case in which the first wireless communication device 410 operates as a master device is explained as an example, but this case merely corresponds to an example, and the second wireless communication device may also operate as a master device.

According to an embodiment, in operation 710, the electronic device 101 may establish a first communication link with the first wireless communication device 410.

In an embodiment, the electronic device 101 may scan a Bluetooth signal transmitted from the first wireless communication device 410 and transmit a Bluetooth connection request to the first wireless communication device 410. The electronic device 101 may establish the first communication link with the first wireless communication device 410 according to reception of a Bluetooth connection response request from the first wireless communication device 410.

In an embodiment, the electronic device 101 may transmit, to the first wireless communication device 410 through the first communication link, information related to wireless communication establishment of the electronic device 101 (e.g., information on a device currently paired with the electronic device 101, information on a pairing history of the electronic device 101, and information on a synchronization identifier).

In an embodiment, data may be transmitted and received between the electronic device and the first wireless communication device 410 through a wireless communication link. For example, the electronic device 101 may transmit an audio signal to the first wireless electronic device 410 through the first communication link. In addition, for example, the electronic device 101 may receive information on a battery state of the first wireless communication device 410 through the wireless communication link. In addition, for example, the electronic device 101 may receive device capability information (e.g., channel direction information, supported audio system information, and information on a matched counterpart device) on the first wireless communication device 410 through the wireless communication link.

In an embodiment, the electronic device 101 may transmit, to the first wireless communication device 410 through the wireless communication link, information related to wireless communication establishment of the electronic device 101 (e.g., information on a wireless communication device (e.g., the first wireless communication device 410) currently paired with the electronic device 101, information on a pairing history of the electronic device 101, and information on a counterpart device matched to a currently paired wireless communication device (e.g., the first wireless communication device 410)).

In an embodiment, the electronic device 101 may transmit role information (e.g., a master device or a slave device) on the first wireless communication device 410 to the first wireless communication device 410 through the wireless communication link. For example, the electronic device 101 may generate role information, based on information on a battery state of the first wireless communication device 410 received from the first wireless communication device 410, and may transmit the generated role information to the first wireless communication device 410.

According to an embodiment, in operation 720, the electronic device 101 may display a first user interface related to matching between the first wireless communication device 410 and the second wireless communication device 420 in the state in which the first communication link is established.

In an embodiment, the first user interface may include an object indicating information related to a Bluetooth connection state of the electronic device 101. For example, the first user interface may include an object indicating information related to a type, a battery state, and a Bluetooth connection state of the first wireless communication device 410. In addition, for example, the first user interface may include an object indicating information on a connection state and a remaining power of a cradle.

In an embodiment, although not illustrated in the drawing, when another wireless communication device is matched before the first wireless communication device 410, the first user interface may include an object for receiving a user input to release matching with said another wireless communication device.

In an embodiment, the first user interface may include an object for receiving a user input allowing the electronic device 101 to transmit a matching command to the first wireless communication device 410.

According to an embodiment, in operation 730, the electronic device 101 may receive a user input to perform matching from the first user interface.

In an embodiment, the electronic device 101 may receive a user input from an object for receiving a user input to transmit a matching command to the first wireless communication device 410.

According to an embodiment, in operation 740, the electronic device 101 may transmit a matching command to the first wireless communication device 410 in response to reception of a user input to perform matching.

In an embodiment, the electronic device 101 may transmit a matching command to the first wireless communication device 410 in response to reception of a user input from an object for receiving a user input to transmit a matching command to the first wireless communication device 410.

According to an embodiment, in operation 750, the electronic device 101 may receive a matching completion signal from the first wireless communication device 410.

In an embodiment, the electronic device 101 may receive a matching completion signal including a matching identifier of the second wireless communication device 420 from the first wireless communication device 410.

In an embodiment, the electronic device 101 may receive a matching completion signal from the second wireless communication device 420 rather than the first wireless communication device 410. For example, when a master device is configured to be the second wireless communication device 420 rather than the first wireless communication device 410, the electronic device 101 may receive a matching completion signal from the second wireless communication device 420.

According to an embodiment, in operation 760, the electronic device 101 may display a second user interface including information indicating completion of matching between the first wireless communication device 410 and the second wireless communication device 420.

In an embodiment, the second user interface may include an object indicating success of matching if matching is successful. In an embodiment, the second user interface may include an object indicating failure of matching if matching is not successful.

Figure 8:
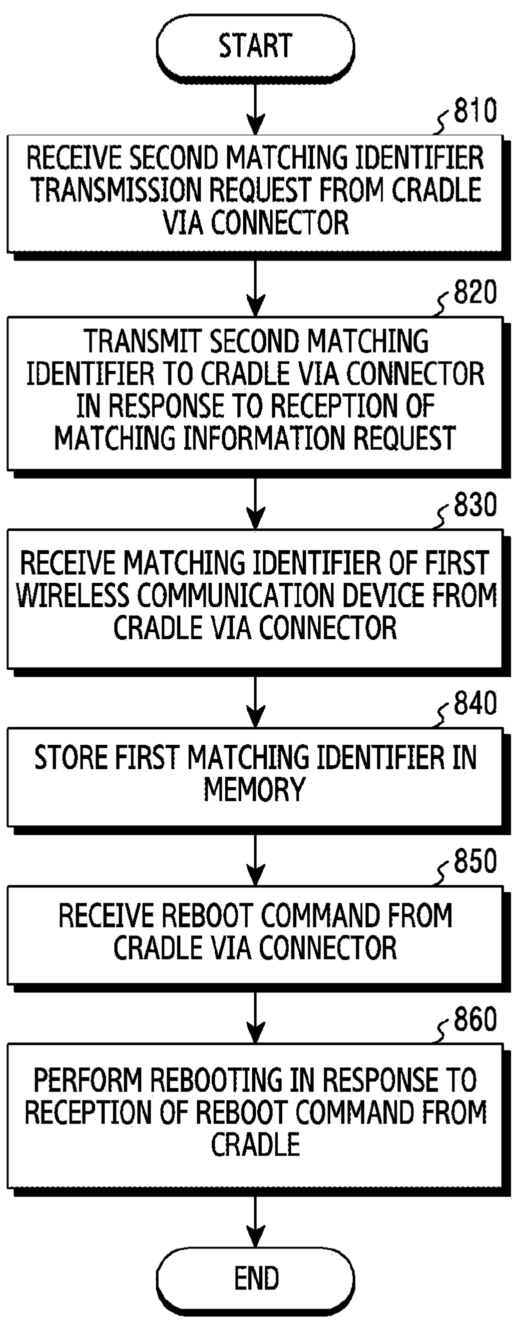
FIG. 8 is a flowchart of example operations of a second wireless communication device according to various embodiments.

FIG. 8 is a flowchart of example operations of a second wireless communication device according to various embodiments. The first wireless communication device 410 in FIG. 8 may be a device corresponding to the first wireless communication device 410 in FIG. 4. A second wireless communication device in FIG. 8 may be a device corresponding to the second wireless communication device 420 in FIG. 4. A cradle in FIG. 8 may be a device corresponding to the cradle 300 in FIG. 3. An electronic device in FIG. 8 may be a device corresponding to the electronic device 101 in FIG. 1. One of the first wireless communication device 410 and the second wireless communication device may operate as a master device, and the other one may operate as a slave device. In the following description, a case in which the first wireless communication device 410 operates as a master device is explained as an example, but this case merely corresponds to an example, and the second wireless communication device may also operate as a master device.

According to an embodiment, in operation 810, the second wireless communication device 420 may receive a second matching identifier transmission request via the connector 322. In an embodiment, the second matching identifier may include a Bluetooth address of the second wireless communication device 420.

According to an embodiment, in operation 820, the second wireless communication device 420 may transmit the second matching identifier to the cradle 300 via the connector 322 in response to reception of the second matching identifier transmission request. For example, the second wireless communication device 420 may transmit a second Bluetooth address to the cradle 300 via the connector 322 in response to reception of the second matching identifier transmission request.

According to an embodiment, in operation 830, the second wireless communication device 420 may receive a first matching identifier from the cradle 300 via the connector 322. For example, the second wireless communication device 420 may receive a Bluetooth address of the first wireless communication device 410 from the cradle 300 via the connector 322.

According to an embodiment, in operation 840, the second wireless communication device 420 may store the first matching identifier in a memory. In an embodiment, the second wireless communication device 420 may store the first Bluetooth address received from the cradle 300 in a peer area of the memory.

According to an embodiment, in operation 850, the second wireless communication device 420 may receive a reboot command from the cradle 300.

According to an embodiment, in operation 860, the second wireless communication device 420 may perform rebooting in response to reception of the reboot command from the cradle 300.

Figure 9:
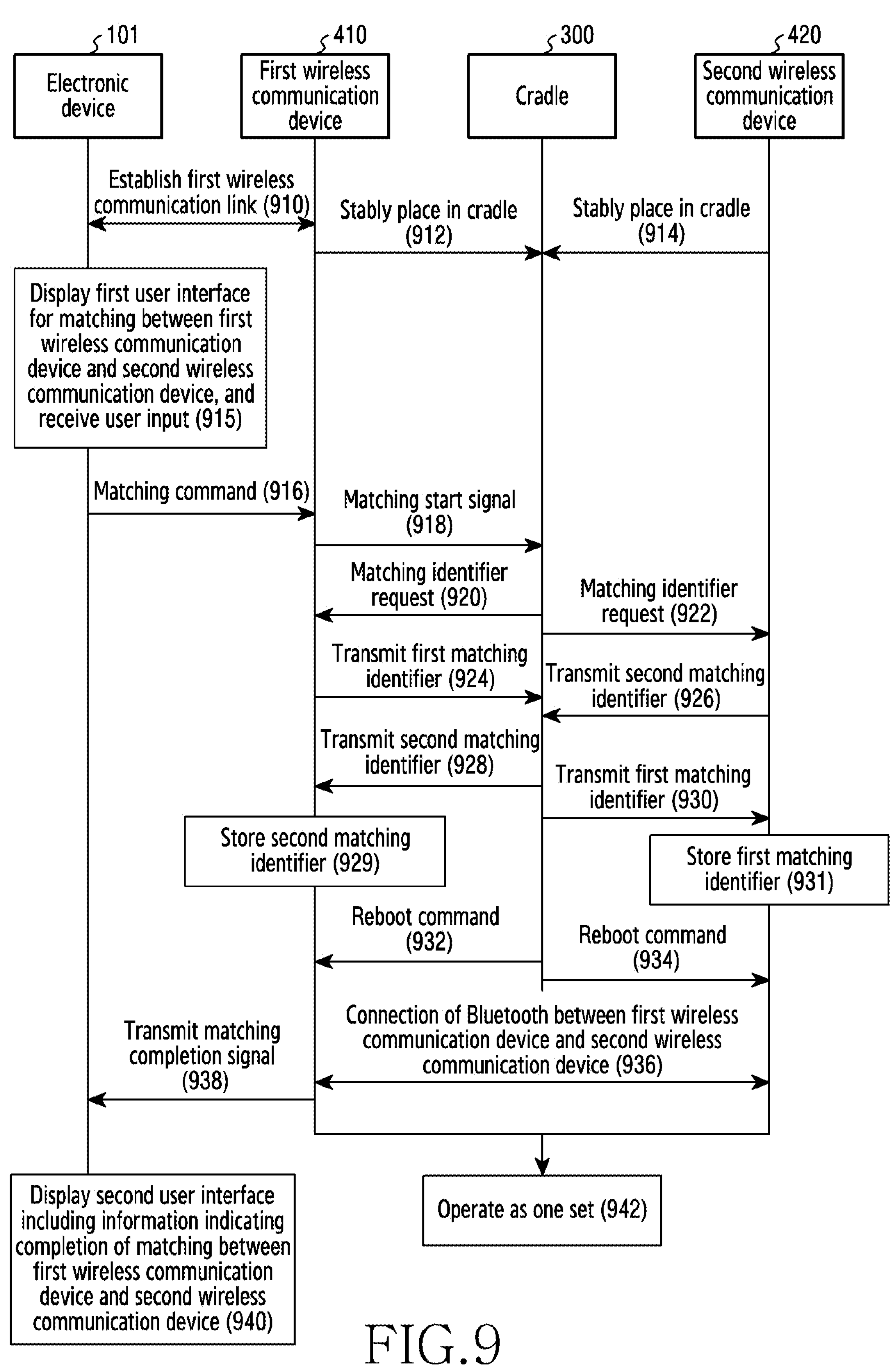
FIG. 9 is a sequence diagram of example matching according to various embodiments.

FIG. 9 is a sequence diagram of example matching according to various embodiments of the disclosure. The first wireless communication device 410 in FIG. 9 may be a device corresponding to the first wireless communication device 410 in FIG. 4. A second wireless communication device in FIG. 9 may be a device corresponding to the second wireless communication device 420 in FIG. 4. A cradle in FIG. 9 may be a device corresponding to the cradle 300 in FIG. 3. An electronic device in FIG. 9 may be a device corresponding to the electronic device 101 in FIG. 1. One of the first wireless communication device 410 and the second wireless communication device may operate as a master device, and the other one may operate as a slave device. In the following description, a case in which the first wireless communication device 410 operates as a master device is explained as an example, but this case merely corresponds to an example, and the second wireless communication device may also operate as a master device. Operations illustrated in FIG. 9 may correspond to the operations of the electronic device 101, the first wireless communication device 410, the second wireless communication device 420, and the cradle 300 illustrated in FIGS. 5, 6, 7, and 8.

According to an embodiment, in operation 910, the electronic device 101 and the first wireless communication device 410 may establish a wireless communication link (a first communication link).

In an embodiment, the electronic device 101 may scan a Bluetooth broadcast signal transmitted from the first wireless communication device 410 and transmit a Bluetooth connection request to the first wireless communication device 410. The first wireless communication device 410 may transmit a Bluetooth connection response to the electronic device 101, and accordingly, a wireless communication link between the electronic device 101 and the first wireless communication device 410 may be established.

According to an embodiment, in operation 912 and operation 914, the first wireless communication device 410 and the second wireless communication device 420 may be placed in the cradle 300. According to FIG. 9, operation 912 and operation 914 are illustrated to be performed after establishment of the communication link between the electronic device 101 and the first wireless communication device 410. However, the order of operations is not limited thereto, and, for example, the devices may be placed in the cradle 300 before operation 910.

In an embodiment, the connector 312 of the first wireless communication device 410 may be electrically connected to the first connector 306 of the cradle 300. In an embodiment, the connector 322 of the second wireless communication device 420 may be electrically connected to the second connector 308 of the cradle 300.

In an embodiment, when the first wireless communication device 410 and the second wireless communication device 420 are mounted in the cradle 300, the cradle 300 may supply power to the first wireless communication device 410 and the second wireless communication device 420.

According to an embodiment, in operation 915, the electronic device 101 may display a first user interface related to matching between the first wireless communication device 410 and the second wireless communication device 420, and receive a user input via the first user interface.

In an embodiment, the first user interface may include, for example, an object for receiving a user input to perform matching between the first wireless communication device 410 and the second wireless communication device 420.

According to an embodiment, in operation 916, the electronic device 101 may transmit a matching command to the first wireless communication device 410.

In an embodiment, when a user input to perform matching is received via the first user interface, the electronic device 101 may transmit a matching command to the first wireless communication device 410.

According to an embodiment, in operation 918, the first wireless communication device 410 may transmit a matching start signal to the cradle 300.

In an embodiment, the first wireless communication device 410 may transmit a matching start signal to the cradle 300 in response to reception of a matching command from the electronic device 101.

According to an embodiment, in operation 920 and operation 922, the cradle 300 may transmit matching identifier transmission requests to the first wireless communication device 410 and the second wireless communication device 420.

In an embodiment, the cradle 300 may request the first wireless communication device 410 and the second wireless communication device 420 to transmit matching identifiers thereof, in response to reception of a matching start signal from the first wireless communication device 410. A matching identifier may include a Bluetooth address of a wireless communication device.

According to an embodiment, in operation 924, the first wireless communication device 410 may transmit a first matching identifier to the cradle 300, and, in operation 926, the second wireless communication device 420 may transmit a second matching identifier to the cradle 300. In an embodiment, the first matching identifier may include a Bluetooth address of the first wireless communication device 410, and the second matching identifier may include a Bluetooth address of the second wireless communication device 420.

According to an embodiment, in operation 928, the cradle 300 may transmit the second matching identifier to the first wireless communication device 410, and in operation 930, may transmit the first matching identifier to the second wireless communication device 420.

According to an embodiment, in operation 929, the first wireless communication device 410 may store the second matching identifier received in operation 928 in a peer area of a memory of the first wireless communication device 410. In an embodiment, the first wireless communication device 410 may store the Bluetooth address of the second wireless communication device 420 in the peer area of the memory, thereby configuring the second wireless communication device 420 as a device operating in the same one set with the first wireless communication device 410.

According to an embodiment, in operation 931, the second wireless communication device 420 may store the first matching identifier received in operation 930 in a peer area of a memory of the second wireless communication device 420. In an embodiment, the second wireless communication device 420 may store the Bluetooth address of the first wireless communication device 410 in the peer area of the memory, thereby configuring the first wireless communication device 410 as a device operating in the same one set with the second wireless communication device 420.

According to an embodiment, in operation 932 and operation 934, the cradle 300 may transmit reboot commands to the first wireless communication device 410 and the second wireless communication device 420.

In an embodiment, after passage of a designated time from a time point at which the first matching identifier and the second matching identifier are transmitted, the cradle 300 may transmit reboot commands to the first wireless communication device 410 and the second wireless communication device 420. In an embodiment, the cradle 300 may transmit reboot commands to the first wireless communication device 410 and the second wireless communication device 420 in response to reception of matching identifier storage completion signals from the first wireless communication device 410 and the second wireless communication device 420.

According to an embodiment, in operation 936, the first wireless communication device 410 and the second wireless communication device 420 may establish a third communication link via a Bluetooth connection.

According to an embodiment, in operation 938, the first wireless communication device 410 may transmit a matching completion signal to the electronic device 101. In an embodiment, the first wireless communication device 410 may transmit a matching completion signal to the electronic device 101 through the first communication link. In an embodiment, when the second wireless communication device 420 is a master device, the second wireless communication device 420 may transmit a matching completion signal to the electronic device 101. In this case, before the second wireless communication device 420 transmits a matching completion signal to the electronic device 101, an operation of establishing a second communication link between the second wireless communication device 420 and the electronic device 101 may be performed first. The operation of establishing a second wireless link may, for example, be an operation corresponding to the operation of establishing a first wireless link.

According to an embodiment, in operation 940, the electronic device 101 may display a second user interface including information indicating completion of matching. In an embodiment, the second user interface may include information indicating success of matching if the matching is successful. In an embodiment, the second user interface may include information indicating failure of matching if the matching is not successful.

According to an embodiment, in operation 942, the first wireless communication device 410 and the second wireless communication device 420 may operate as one set. In an embodiment, the first wireless communication device 410 and the second wireless communication device 420 may simultaneously output, via speakers, an audio signal received from the electronic device 101.

Figure 10:
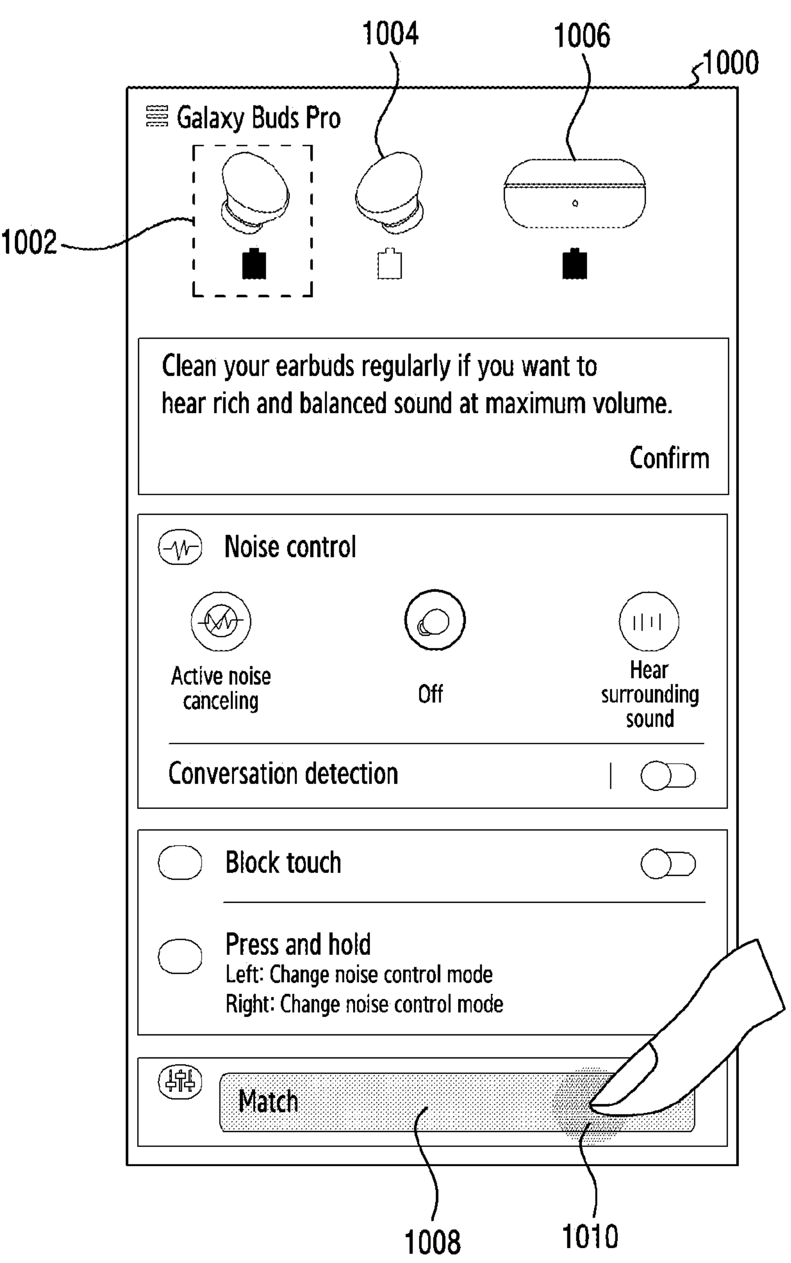
FIG. 10 illustrates an example of a user interface related to matching according to various embodiments.
Figure 11:
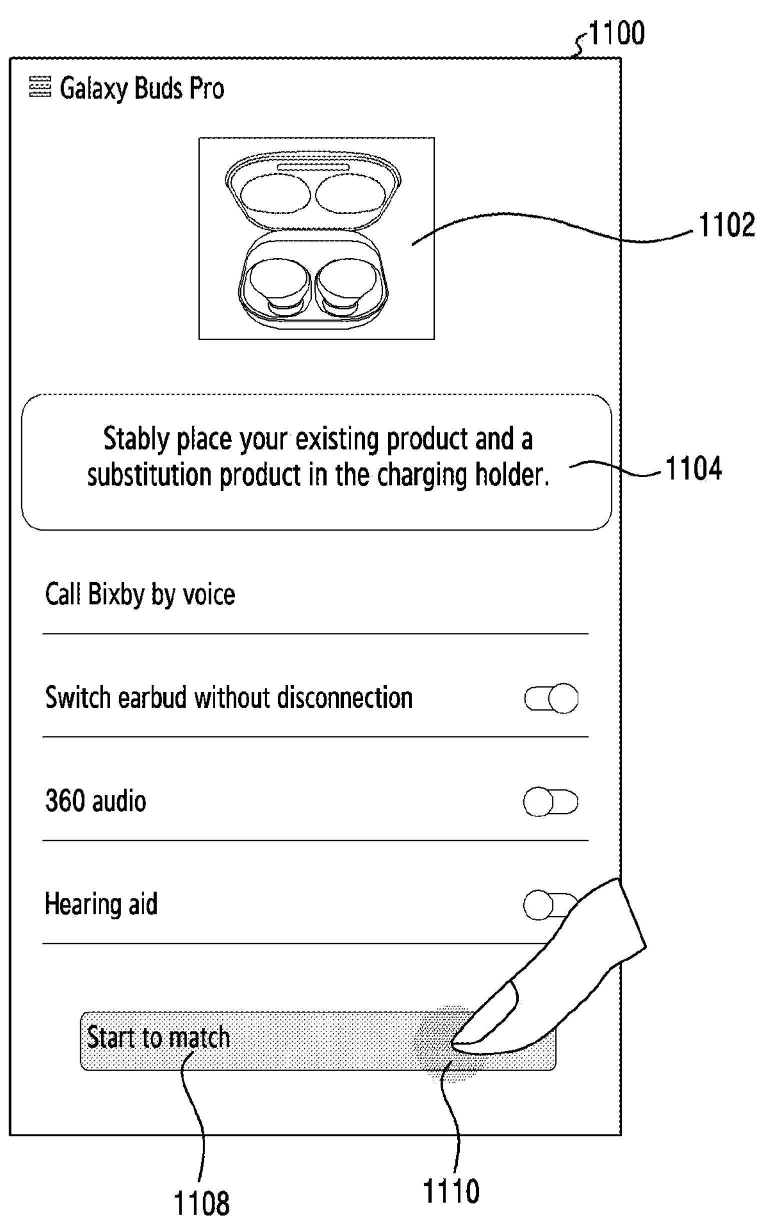
FIG. 11 illustrates an example of a user interface related to matching according to various embodiments.

FIG. 10 illustrates an example of a user interface 1000 related to matching according to various embodiments. FIG. 11 illustrates an example of a user interface 1100 related to matching according to various embodiments. The user interfaces related to matching illustrated in FIG. 10 and FIG. 11 may include the first user interface described above.

In an embodiment, the first user interface 1000 may include an object 1002 indicating a currently paired wireless communication device (e.g., the first wireless communication device 410), an object 1004 indicating a connectable wireless communication device, and an object 1006 indicating the cradle 300.

In an embodiment, the first user interface 1000 may include an object 1008 for receiving a user input 1010 to perform matching between the first wireless communication device 410 and the second wireless communication device 420.

In an embodiment, the object 1002 indicating a currently paired wireless communication device may include the name of the currently paired wireless communication device, the battery state thereof, and an icon indicating the wireless communication device.

In an embodiment, the object 1006 indicating a cradle may include an icon indicator the cradle, and information indicating a battery state of the cradle.

In an embodiment, the first user interface 1000 may include information related to a current Bluetooth connection state. For example, an object providing a setting option for improvement of the sound quality of a wireless earphone, an object for controlling noise, and information on a manipulation of the wireless earphone may be included.

In an embodiment, when the user input 1010 is received via the object 1008 of the first user interface 1000, the electronic device 101 may display the first user interface 1100.

In an embodiment, although not illustrated in the drawing, the first user interface 1000 may display information related to the color of a wireless communication device (e.g., a first wireless communication device 410 or a second wireless communication device 420) which is connected to or is able to be connected (is connectable) to the electronic device 101. For example, the first user interface may display that the color of the first wireless communication device 410 connected to the electronic device 101 is a first color, and display that the color of the second wireless communication device 420 that is able to be matched is a second color. A user may determine whether to perform matching, based on information on the color of each of the wireless communication devices displayed on the user interface, and accordingly, the user input 1010 may be received via the object 1008.

In an embodiment, the first user interface 1000 may include an object for receiving a user input related to whether to perform matching. For example, when it is identified that a wireless communication device (e.g., the second wireless communication device 420) that has never previously been registered in the electronic device 100 is mounted in the cradle, the electronic device 101 may display, via the first user interface 1000, information indicating identification of a new wireless communication device and an object for receiving a user input related to whether to perform matching.

Referring to FIG. 11, the first user interface 1100 may include a user interface that is displayed when the user input 1010 to perform matching is identified via the object 1008 via the first user interface 1000.

In an embodiment, the first user interface 1100 may include an example image 1102 and an object 1104 including information notifying that the first wireless communication device 410 and the second wireless communication device 420 are required to be mounted in the cradle 300. The user may receive, through the object 1104 and the image 1102, information indicating that the user is required to mount the first wireless communication device 410 and the second wireless communication device 420 in the cradle 300.

In an embodiment, when the user input 1110 is received via the object 1108 of the first user interface 1100, the electronic device 101 may transmit a matching command signal to the first wireless communication device 410.

Figure 12:
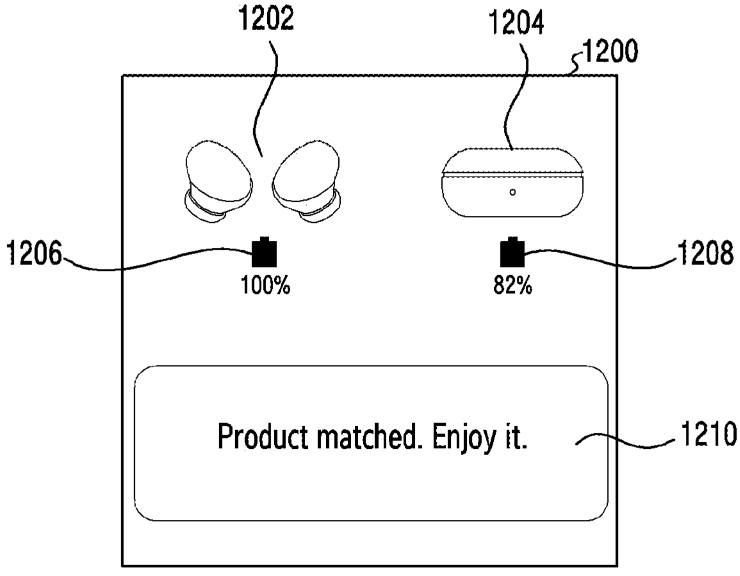
FIG. 12 illustrates an example of a second user interface related to matching according to various embodiments.
Figure 13:
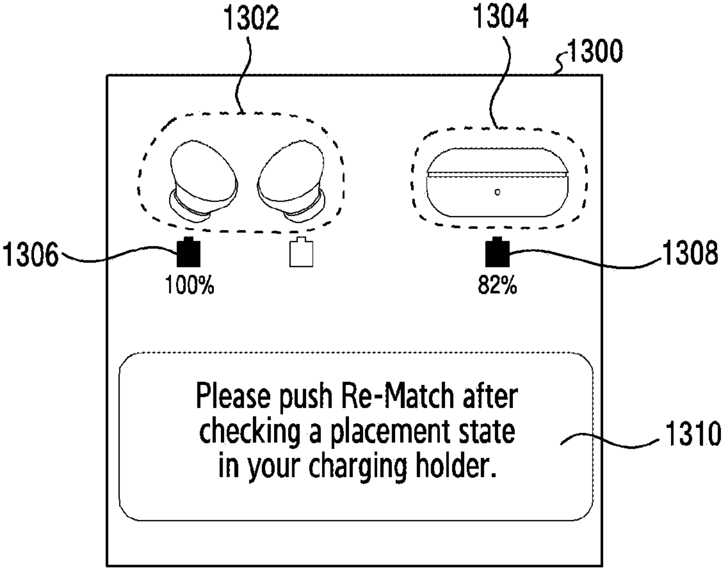
FIG. 13 illustrates an example of a second user interface related to matching according to various embodiments.

FIG. 12 illustrates an example of a second user interface according to various embodiments. FIG. 13 illustrates an example of a second user interface according to various embodiments. FIG. 12 and FIG. 13 may be understood as a user interface displaying information indicating whether the first wireless communication device 410 and the second wireless communication device 420 have been successfully matched.

In an embodiment, a second user interface 1200 may be displayed via a display (e.g., the first display module 160 in FIG. 1) of an electronic device when matching between the first wireless communication device 410 and the second wireless communication device 420 is successful.

In an embodiment, the second user interface 1200 may include an object 1202 indicating currently connected wireless communication devices, and an object 1206 indicating a battery state of the currently connected wireless communication devices. Although not illustrated in the drawing, objects indicating respective battery states of the currently connected wireless communication devices may be included.

In an embodiment, the second user interface 1200 may include an object indicating a cradle 1204, and an object 1208 indicating a battery state of the cradle 1204.

In an embodiment, the second user interface 1200 may include an object 1210 including information indicating that the first wireless communication device 410 and the second wireless communication device 420 have been successfully matched.

In an embodiment, a second user interface 1300 may be displayed via a display of an electronic device when matching between the first wireless communication device 410 and the second wireless communication device 420 fails.

In an embodiment, the second user interface 1300 may include an object 1302 indicating a currently connected wireless communication device (e.g., the first wireless communication device 410), and an object 1306 indicating a battery state of the currently connected wireless communication device.

In an embodiment, the second user interface 1300 may include an object indicating a cradle 1304, and an object 1308 indicating a battery state of the cradle 1304.

In an embodiment, the second user interface 1300 may include an object 1310 including information indicating that matching between the first wireless communication device 410 and the second wireless communication device 420 has failed.

A first wireless communication device (e.g., the first wireless communication device 410) according to an embodiment of the disclosure may include a communication module (e.g., the communication circuit 220) configured to establish a wireless communication link with an electronic device (e.g., the electronic device 101), a connector configured to be connected to a cradle (e.g., the cradle 300) when the first wireless communication device is placed in the cradle, a memory (e.g., the memory 280) including a first area in which a matching identifier of the first wireless communication device is stored, and a second area for storing a matching identifier of a second wireless communication device matched to the first wireless communication device, and a processor (e.g., the processor 210) connected to the communication module and the memory, wherein the processor is configured to receive a matching identifier transmission request from the cradle, transmit the matching identifier of the first wireless communication device to the cradle in response to the reception of the matching identifier transmission request, receive the matching identifier of the second wireless communication device (e.g., the second wireless communication device 420) from the cradle, store the matching identifier of the second wireless communication device in the second area of the memory in response to the reception of the matching identifier of the second wireless communication device, and transmit a matching completion signal to the electronic device through the wireless communication link in response to the storage of the matching identifier of the second wireless communication device in the second area of the memory.

In an embodiment, the processor may be configured to: establish a wireless communication link with the electronic device, receive a matching command from the electronic device through the wireless communication link, and transmit a matching start signal to the cradle in response to the reception of the matching command.

In an embodiment, the processor may be configured to receive wireless communication establishment information on the electronic device through the wireless communication link, and the wireless communication establishment information may include at least one of information on a device currently paired with the electronic device, and information on a pairing history of the electronic device.

In an embodiment, the processor may be configured to receive role information on the first wireless communication device through the wireless communication link.

In an embodiment, the processor may be configured to receive a reboot command from the cradle, and reboot the first wireless communication device in response to the reception of the reboot command.

In an embodiment, the matching identifier of the first wireless communication device may include a Bluetooth address of the first wireless communication device, and the matching identifier of the second wireless communication device may include a Bluetooth address of the second wireless communication device.

In an embodiment, the processor may be configured to receive a synchronization identifier (synced ID) through the wireless communication link, and the matching identifier of the first wireless communication device and the matching identifier of the second wireless communication device may include the synchronization identifier.

In an embodiment, the processor may be configured to transmit a first advertising signal to the electronic device, receive a Bluetooth connection request signal from the electronic device, and transmit a Bluetooth connection response signal to the electronic device.

In an embodiment, the processor may be configured to receive a second advertising signal from the second wireless communication device in a state in which the matching identifier of the second wireless communication device is stored, transmit a Bluetooth connection request signal to the second wireless communication device, receive a Bluetooth connection response signal from the second wireless communication device, and establish a wireless communication link with the second wireless communication device.

In an embodiment, the processor may be configured to receive, from the cradle, information indicating that the second wireless communication device has been placed in the cradle.

A cradle (e.g., the cradle 300) according to an embodiment of the disclosure may include a first connector (e.g., the connector 306) configured for electrical connection with a first wireless communication device (e.g., the first wireless communication device 410), a second connector (e.g., the second connector 308) configured for electrical connection with a second wireless communication device (e.g., the second wireless communication device 420), and a processor electrically connected to the first connector and the second connector, wherein the processor is configured to identify that the first wireless communication device and the second wireless communication device are mounted in the cradle, receive a matching start signal from the first wireless communication device in a state in which the first wireless communication device and the second wireless communication device are mounted in the cradle, transmit information for matching between the first wireless communication device and the second wireless communication device to the first wireless communication device and the second wireless communication device via the first connector and the second connector, respectively, in response to the reception of the matching start signal from the first wireless communication device, and transmit reboot commands to the first wireless communication device and the second wireless communication device.

In an embodiment, the processor may be configured to identify a change in resistance values measured via the first connector and the second connector, so as to identify that the first wireless communication device and the second wireless communication device are placed in the cradle.

In an embodiment, the processor may be configured to transmit a matching identifier transmission request to the first wireless communication device and the second wireless communication device in response to the reception of the matching start signal, receive a matching identifier of the first wireless communication device from the first wireless communication device, receive a matching identifier of the second wireless communication device from the second wireless communication device, transmit the matching identifier of the first wireless communication device to the second wireless communication device, and transmit the matching identifier of the second wireless communication device to the first wireless communication device.

In an embodiment, the matching identifier of the first wireless communication device and the matching identifier of the second wireless communication device may correspond to a synchronization identifier (synced ID).

In an embodiment, the processor may be configured to supply power to the first wireless communication device and the second wireless communication device.

An electronic device (e.g., the electronic device 101) according to an embodiment of the disclosure may include a communication module (e.g., the communication module 190), a display (e.g., the display module 160) configured to display a user interface related to matching between a first wireless communication device (e.g., the first wireless communication device 410) and a second wireless communication device (e.g., the second wireless communication device 420), and a processor (e.g., the processor 120) electrically connected to the communication module and the display, wherein the processor is configured to establish a first communication link with the first wireless communication device, display a first user interface related to matching between the first wireless communication device and the second wireless communication device via the display in a state in which the first communication link is established, receive a user input to perform matching from the first user interface, transmit a matching command to the first wireless communication device in response to the reception of the user input to perform matching, receive a matching completion signal from the first wireless communication device, and display, via the display, a second user interface including information indicating that matching between the first wireless communication device and the second wireless communication device has been completed.

In an embodiment, the processor may be configured to transmit information on wireless communication establishment of the electronic device to the first wireless communication device through a second communication link, and the information on wireless communication establishment may include at least one of information on a device currently paired with the electronic device, and information on a pairing history of the electronic device.

In an embodiment, the processor may be configured to receive information on a battery state of the first wireless communication device and information on a battery of the second wireless communication device through the first communication link, generate role information including one device among the first wireless communication device and the second wireless communication device as a master device, and including a remaining device as a slave device, based on the information on the battery state of the first wireless communication device and the information on the battery of the second wireless communication device, and transmit the role information to at least one of the first wireless communication device and the second wireless communication device.

In an embodiment, the first user interface may include information on a connection state of the first wireless communication device, a battery state of the first wireless communication device, and a different connectable device.

In an embodiment, the processor may be configured to transmit a synchronization identifier (synced ID) through the first communication link.

In an embodiment, the at least one processor may configured to, in response to the reception of the matching command by the first wireless communication device, store identification information on the second wireless communication device in the first wireless communication device, and store identification information on the first wireless communication device in the second wireless communication device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or combinations thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term “non-transitory” storage medium may refer, for example, to a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An audio device comprising a first wireless communication device, a second wireless communication device and a cradle:

wherein the first wireless communication device comprising:

a communication module, including communication circuitry, configured to establish a wireless communication link with an electronic device;

a connector configured for connection to the cradle;

a memory including a first area in which a first matching identifier of the first wireless communication device is stored, and a second area in which a second matching identifier of a second wireless communication device is stored; and at least one first processor including processing circuitry and connected to the communication module and the memory, wherein the at least one first processor is configured, when the first wireless communication device is connected to the cradle, to:

establish the wireless communication link with the electronic device, receive a matching command from the electronic device through the wireless communication link for matching the first wireless communication device to the second wireless communication device connected to the cradle, receive a matching identifier transmission request from the cradle, transmit the first matching identifier of the first wireless communication device to the cradle in response to receiving the matching identifier transmission request, receive the second matching identifier of the second wireless communication device from the cradle, store the second matching identifier of the second wireless communication device in the second area of the memory in response to receiving the second matching identifier of the second wireless communication device, and transmit a matching completion signal to the electronic device through the wireless communication link in response to the storage of the second matching identifier of the second wireless communication device in the second area of the memory.

2. The audio device of claim 1, wherein the at least one first processor is configured to:

transmit a matching start signal to the cradle in response to receiving the matching command.

3. The audio device of claim 1, wherein the at least one first processor is configured to receive wireless communication establishment information on the electronic device through the wireless communication link, and wherein the wireless communication establishment information comprises at least one of information on a device currently paired with the electronic device, or information on a pairing history of the electronic device.

4. The audio device of claim 1, wherein the at least one first processor is configured to receive role information on the first wireless communication device through the wireless communication link.

5. The audio device of claim 1, wherein the at least one first processor is configured to:

receive a reboot command from the cradle after receiving the second matching identifier, reboot the first wireless communication device in response to receiving the reboot command, and transmit the matching completion signal to the electronic device after a reboot in response to the reboot command.

6. The audio device of claim 5, wherein the first matching identifier of the first wireless communication device comprises a Bluetooth address of the first wireless communication device, and wherein the second matching identifier of the second wireless communication device comprises a Bluetooth address of the second wireless communication device.

7. The audio device of claim 5, wherein the at least one first processor is configured to receive a synchronization identifier through the wireless communication link, and wherein the first matching identifier of the first wireless communication device and the second matching identifier of the second wireless communication device comprise the synchronization identifier.

8. The audio device of claim 2, wherein the at least one first processor is configured to:

transmit a first advertising signal to the electronic device, receive a Bluetooth connection request signal from the electronic device, and transmit a Bluetooth connection response signal to the electronic device.

9. The audio device of claim 2, wherein the at least one first processor is configured to:

receive a second advertising signal from the second wireless communication device in a state in which the second matching identifier of the second wireless communication device is stored, transmit a Bluetooth connection request signal to the second wireless communication device, receive a Bluetooth connection response signal from the second wireless communication device, and establish a wireless communication link with the second wireless communication device.

10. The audio device of claim 1, wherein the at least one first processor is configured to receive, from the cradle, information indicating that the second wireless communication device is connected to the cradle.

11. The audio device of claim 1, wherein the cradle comprises:

a first connector configured for electrical connection with the first wireless communication device;

a second connector configured for electrical connection with the second wireless communication device; and at least one second processor comprising processing circuitry and electrically connected to the first connector and the second connector, wherein the at least one second processor is configured to:

identify that the first wireless communication device and the second wireless communication device are connected in the cradle, receive a matching start signal from the first wireless communication device in a state in which the first wireless communication device and the second wireless communication device are connected in the cradle, in response to receiving the matching start signal from the first wireless communication device, transmit a first information for matching between the first wireless communication device and the second wireless communication device to the first wireless communication device via the first connector and transmit a second information for matching between the first wireless communication device and the second wireless communication device to the second wireless communication device via the second connector, and transmit a reboot command to at least one of the first wireless communication device or the second wireless communication device.

12. The audio device of claim 11, wherein the at least one second processor is configured to identify a change in resistance values measured via the first connector and the second connector, so as to identify that the first wireless communication device and the second wireless communication device are connected to the cradle.

13. The audio device of claim 11, wherein the at least one second processor is configured to:

transmit a matching identifier transmission request to the first wireless communication device and to the second wireless communication device in response to receiving the matching start signal, receive the first matching identifier of the first wireless communication device from the first wireless communication device, receive the second matching identifier of the second wireless communication device from the second wireless communication device, transmit the first matching identifier of the first wireless communication device to the second wireless communication device, and transmit the second matching identifier of the second wireless communication device to the first wireless communication device.

14. The audio device of claim 13, wherein the first matching identifier of the first wireless communication device and the second matching identifier of the second wireless communication device correspond to a synchronization identifier.

15. An electronic device comprising:

a communication module including communication circuitry;

a display configured to display a user interface related to matching between a first wireless communication device and a second wireless communication device; and at least one third processor comprising processing circuitry and electrically connected to the communication module and the display, wherein the at least one third processor is configured to:

establish a first communication link with the first wireless communication device, display a first user interface related to matching between the first wireless communication device and the second wireless communication device via the display in a state in which the first communication link is established, receive a user input to perform matching from the first user interface, transmit, via the first communication link, a matching command to the first wireless communication device in response to receiving the user input to perform matching, wherein the matching command indicates a signal for triggering matching between the first wireless communication device and the second wireless communication device via a cradle in which the first wireless communication device and the second wireless communication device are connected, receive a matching completion signal from the first wireless communication device, and display, via the display, a second user interface including information indicating that matching between the first wireless communication device and the second wireless communication device has been completed.

16. The electronic device of claim 15, wherein the at least one third processor is configured to transmit information on wireless communication establishment of the electronic device to the first wireless communication device through a second communication link, and wherein the information on wireless communication establishment comprises at least one of information on a device currently paired with the electronic device, or information on a pairing history of the electronic device.

17. The electronic device of claim 15, wherein the at least one third processor is configured to:

receive information on a battery state of the first wireless communication device and information on a battery of the second wireless communication device through the first communication link, generate role information including one device among the first wireless communication device and the second wireless communication device as a master device, and including a remaining device as a slave device, based on the information on the battery state of the first wireless communication device and the information on the battery of the second wireless communication device, and transmit the role information to at least one of the first wireless communication device and the second wireless communication device.

18. The electronic device of claim 15, wherein the first user interface comprises information on a connection state of the first wireless communication device, a battery state of the first wireless communication device, and a different connectable device.

19. The electronic device of claim 15, wherein the at least one third processor is configured to transmit a synchronization identifier through the first communication link.

20. The electronic device of claim 15, wherein the at least one third processor is configured to:

in response to receiving the matching completion signal from the first wireless communication device, store identification information on the second wireless communication device in the first wireless communication device, and store identification information on the first wireless communication device in the second wireless communication device.

* * * * *